US006950818B2

(12) United States Patent
Dennis et al.

(10) Patent No.: US 6,950,818 B2
(45) Date of Patent: *Sep. 27, 2005

(54) SYSTEM AND METHOD FOR IMPLEMENTING GROUP POLICY

(75) Inventors: Michael W. Dennis, Redmond, WA (US); Michele L. Freed, North Bend, WA (US); Daniel Plastina, Issaquah, WA (US); Eric R. Flo, Issaquah, WA (US); David E. Kays, Jr., Bellevue, WA (US); Robert E. Corrington, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 437 days.

This patent is subject to a terminal disclaimer.

(21) Appl. No.: 10/254,155

(22) Filed: Sep. 24, 2002

(65) Prior Publication Data

US 2003/0023587 A1 Jan. 30, 2003

Related U.S. Application Data

(63) Continuation of application No. 09/268,455, filed on Mar. 16, 1999, now Pat. No. 6,466,932, which is a continuation-in-part of application No. 09/134,805, filed on Aug. 14, 1998, now abandoned.

(51) Int. Cl.[7] .............................................. G06F 17/30
(52) U.S. Cl. ................... 707/3; 707/9; 707/10; 707/101; 707/104.1; 709/203; 709/226; 709/246; 713/200; 713/201
(58) Field of Search .............................. 707/1, 3, 9, 10, 707/100–102, 103 R, 104, 104.1, 204; 709/203, 220, 223, 225, 226, 246; 713/200, 201; 711/147, 163; 717/176; 715/513

(56) References Cited

U.S. PATENT DOCUMENTS

| 5,335,346 | A | | 8/1994 | Fabbio |
| 5,675,782 | A | | 10/1997 | Montague et al. |
| 5,787,427 | A | * | 7/1998 | Benantar et al. ................ 707/9 |
| 5,822,521 | A | | 10/1998 | Gartner et al. |
| 5,872,928 | A | * | 2/1999 | Lewis et al. ................. 709/222 |
| 5,878,415 | A | * | 3/1999 | Olds ............................. 707/9 |
| 5,958,050 | A | | 9/1999 | Griffin et al. |
| 6,070,244 | A | | 5/2000 | Orchier et al. |
| 6,202,066 | B1 | | 3/2001 | Barkley et al. |
| 6,393,474 | B1 | * | 5/2002 | Eichert et al. .............. 709/223 |

(Continued)

Primary Examiner—Charles Rones
Assistant Examiner—Jacques Veillard
(74) Attorney, Agent, or Firm—Law Offices of Albert S. Michalik, PLLC

(57) ABSTRACT

A method and system for implementing policy by accumulating policies for a policy recipient from policy objects associated with a hierarchically organized structure of containers, such as directory containers (sites, domains and organizational units) that includes the policy recipient. Based on administrator input, policy settings for the policy recipient may be accumulated into a specific order by inheriting policy from higher containers, which may enforce their policy settings over those of lower containers. Policy that is not enforced may be blocked at a container. The result is an accumulated set of group policy objects that are ordered by relative strength to resolve any policy conflicts. Policy may be applied to a policy recipient by calling extensions, such as an extension that layers the policy settings into the registry or an extension that uses policy information from the objects according to the ordering thereof.

30 Claims, 18 Drawing Sheets

U.S. PATENT DOCUMENTS

| | | | |
|---|---|---|---|
| 6,408,326 B1 * | 6/2002 | Larsson et al. | 709/201 |
| 6,441,835 B1 * | 8/2002 | Pazel | 715/769 |
| 6,463,470 B1 * | 10/2002 | Mohaban et al. | 709/223 |
| 6,466,984 B1 * | 10/2002 | Naveh et al. | 709/228 |
| 6,538,668 B1 * | 3/2003 | Ruberg et al. | 715/747 |
| 6,539,425 B1 * | 3/2003 | Stevens et al. | 709/220 |
| 6,598,121 B2 * | 7/2003 | Challenger et al. | 711/122 |
| 6,721,758 B1 * | 4/2004 | Jex et al. | 717/165 |

* cited by examiner

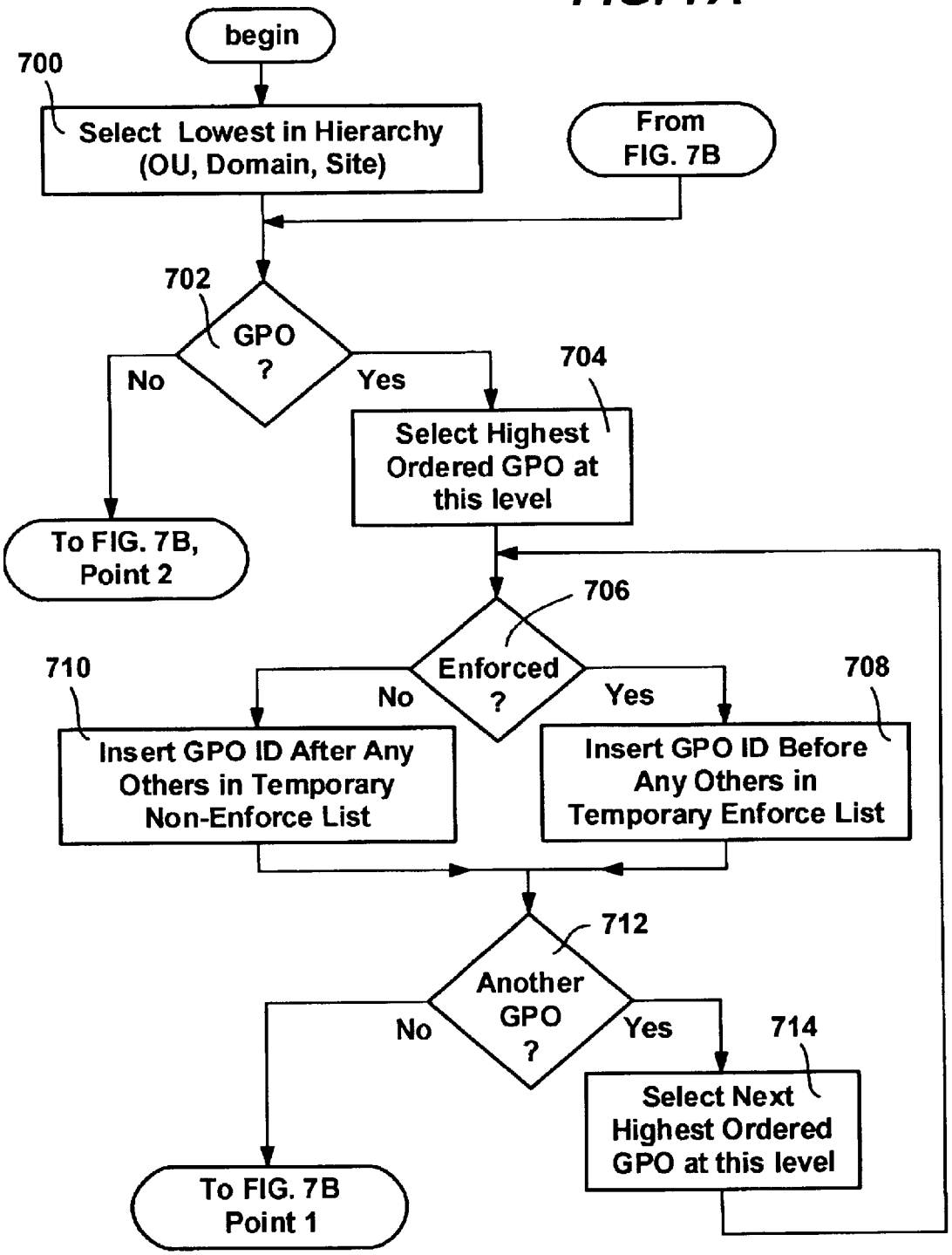

SYSTEM AND METHOD FOR IMPLEMENTING GROUP POLICY

CROSS-REFERENCE TO RELATED APPLICATIONS

The present application is a continuation of copending U.S. patent application Ser. No. 09/268,455, filed Mar. 16, 1999, now U.S. Pat. No. 6,466,932, which is a continuation-in-part of U.S. patent application Ser. No. 09/134,805 entitled "System and Method for Implementing Group Policy," filed on Aug. 14, 1998, now abandoned.

FIELD OF THE INVENTION

The invention relates generally to computer systems and networks, and more particularly to an improved method and system for implementing policy for users and computers.

BACKGROUND OF THE INVENTION

Lost productivity at employees' computer desktops is a major cost for corporations, often resulting from user errors such as modifying system configuration files in ways that render the computer unworkable. Productivity is also lost when a computer desktop is too complex, such as when the desktop has too many non-essential applications and features thereon. At the same time, much of the expense of administering distributed personal computer networks is spent at the desktop, performing tasks such as fixing the settings that the user has incorrectly or inadvertently modified.

As a result, enterprises such as corporations have established policies seeking to define settings for computer users. For example, a corporation may wish to have the same e-mail and word processing program on all their users' desktops, while certain users such as those in the engineering group have a common CAD program not available to users in the finance group. Another policy may selectively prevent a user from connecting to the Internet by writing information into the user's machine registry to prevent access. Centralized policy systems exist to allow an administrator some control over the settings that institute such policies, and provide benefits in scalability to assist in the administration of larger networks. For example, in networks organized into domains, (such as with Microsoft® Windows NT® 4.0), such policies may be applied per domain, based on each domain user's membership in a security group.

However, there are a number of drawbacks present with existing policy systems. One such drawback is that the policies are essentially static, whereby a user can change the settings and simply avoid the policy. It is cost prohibitive to have an administrator or the like go from machine to machine to check the settings on a regular basis. It is possible to force mandatory profiles on a user at each log-on based on the user's group membership. However such mandatory profiles are too inflexible, in that essentially all settings made by an individual user are lost whenever the user logs off. For example, with mandatory profiles, customizations to a desktop, such as window placement, adding words to a user's spell checker and the like, which most enterprises would consider permissible and even desirable because they tend to increase an employee's efficiency, are lost when the user logs off.

Another significant drawback results from relying on a security group membership to determine the settings, particularly in that one group (the first group found for a user) determines that user's settings. Thus, if a user is a member of both the engineering and financial groups, the user will get only one set of policy settings. Present policy-determination systems, such as those basing policy on the domain plus membership in a security group, essentially follow a flat model, which does not fit well with a typical enterprise having a hierarchical organizational structure.

SUMMARY OF THE INVENTION

Briefly, the present invention provides a system and method for implementing policy for users and computers. Policy settings are placed into group policy objects, and each of the policy objects may be associated with one or more containers, such as hierarchically-organized directory objects (containers), e.g., a domain, site or organizational unit. Based upon administrator input, settings from policy objects are accumulated and associated with a policy recipient, whereby users' computers and the like receive the accumulated policy. To accumulate policy, the settings of group policy objects associated with directory containers may be inherited, e.g., the group policy settings may be inherited from directory containers hierarchically above a policy recipient. The administrator may enforce inheritance on some of the policy objects and/or block the inheritance of policy objects associated with other containers. The administrator's input also orders the group policy objects, whereby any conflicts are resolved by the ordering precedence, i.e., the policy's relative strength. Policy may be applied to a recipient by layering the policy settings, based on the ordering, weakest first such that strongest settings overwrite weaker settings, or by seeking policy information from the strongest to weakest policy until the desired policy is located.

A number of very flexible conditions based on an Active Directory hierarchy may be included. By default, an object's parent container in the hierarchy is the strongest factor, but other containers to the parent may affect an object's policy, and by default, group policy affects each of the computers and users in a selected active directory container. A default inheritance evaluates group policy starting with the active directory container that is furthest away, whereby the Active Directory container closest to the computer or user has the ability to override policy set in a higher level container, in the order of Site, Domain, Organizational Unit or Units (SDOU). Moreover, there is provided an option to block inheritance of policy from higher parent containers, however there are also options that allow policy of a specific group policy object to be enforced so that group policy objects in lower level containers cannot override the policy settings of higher level containers, i.e., an enforced option takes precedence. In addition, the effects of group policy may be filtered based on users or computers' membership in a security group.

Other advantages will become apparent from the following detailed description when taken in conjunction with the drawings, in which:

BRIEF DESCRIPTION OF THE DRAWINGS

FIGS. 7A–7B comprise a flow diagram generally representing the steps taken to construct an ordered list of group policy objects for the user represented in FIG. 6 in accordance with one aspect of the present invention;

DETAILED DESCRIPTION OF THE PREFERRED EMBODIMENT

Exemplary Operating Environment

Figure 1:
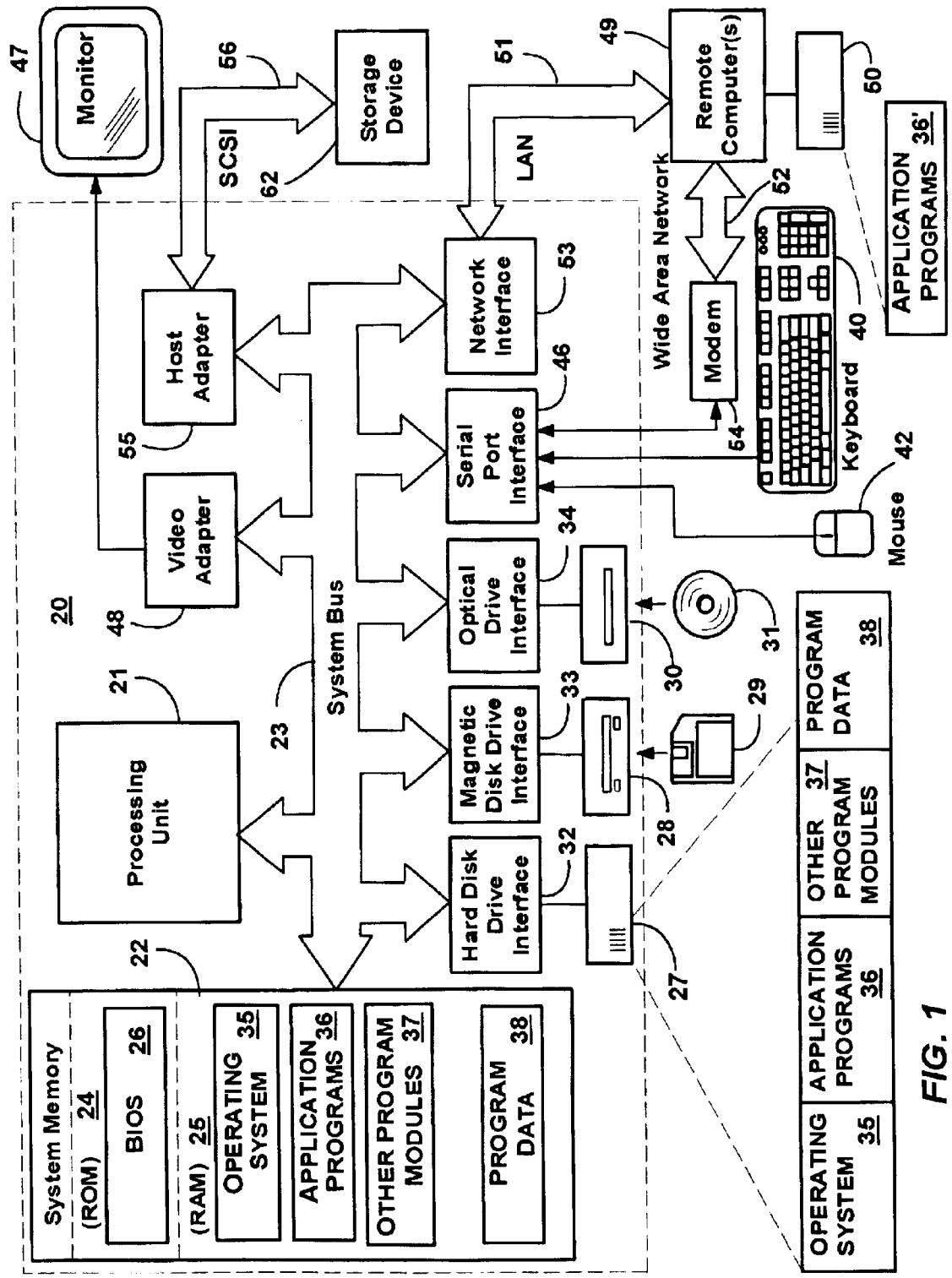
FIG. 1 is a block diagram representing a computer system into which the present invention may be incorporated.

FIG. 1 and the following discussion are intended to provide a brief general description of a suitable computing environment in which the invention may be implemented. Although not required, the invention will be described in the general context of computer-executable instructions, such as program modules, being executed by a personal computer. Generally, program modules include routines, programs, objects, components, data structures and the like that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers and the like. The invention may also be practiced in distributed computing environments where tasks are performed by remote processing devices that are linked through a communications network, including for example, computers, network devices, and printers. In a distributed computing environment, program modules may be located in both local and remote memory storage devices.

With reference to FIG. 1, an exemplary system for implementing the invention includes a general purpose computing device in the form of a conventional personal computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35 (preferably Windows® 2000), one or more application programs 36, other program modules 37 and program data 38. A user may enter commands and information into the personal computer 20 through input devices such as a keyboard 40 and pointing device 42. Other input devices (not shown) may include a microphone, joystick, game pad, satellite dish, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, Intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used. For purposes of the following description, a network administrator may be using the computer system 20 to establish and implement group policies in accordance with the present invention, while users subject to the group policies connect to the network via the remote computers 49.

Group Policy

In general, the present invention provides a method and system for implementing policies throughout a network in a highly flexible, scalable, extensible and efficient manner. To this end, any container capable of having attributes may have a group policy object attached thereto, and the group policy object may be evaluated to apply policy to policy recipients related to that container. For example, policy may be applied by specifying policy settings in the group policy objects, including registry-based settings, scripts, (computer startup and shutdown scripts, and user logon and logoff scripts), user documents and settings, application deployment, software installation, security settings and IP security. Indeed, policy objects may be extended to include virtually any desired information, as long as a client-side (or other) extension that uses the policy object is capable of interpreting and/or handling the information therein. Note that a server-side process may act as the client and interpret the policy, and pass the results to another client, e.g., a server-side extension may receive and process one or more policy objects and transmit the results of its processing to a router which then performs according to that policy.

Figure 2:
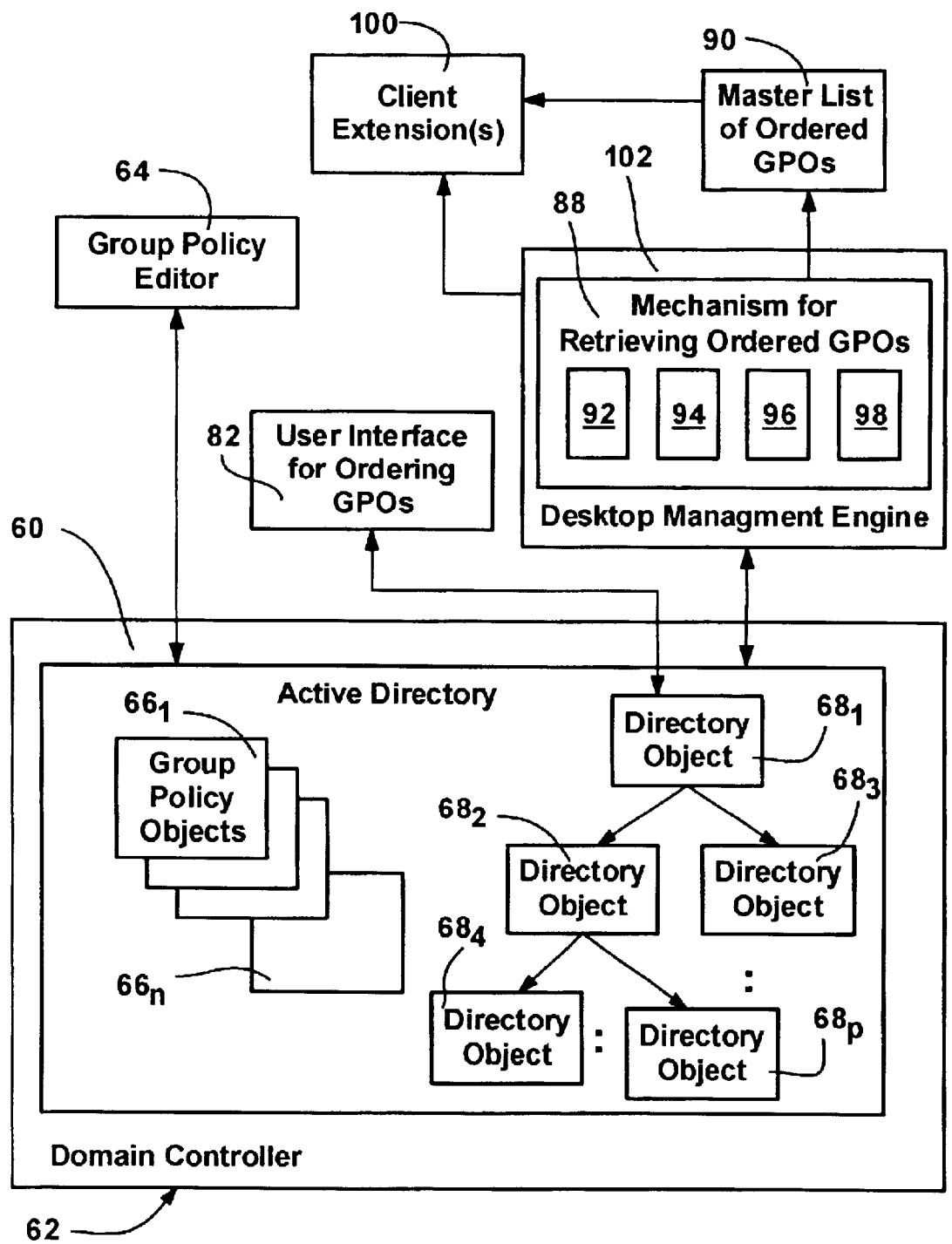
FIG. 2 is a block diagram generally representing exemplary components for implementing policy in accordance with various aspects of the present invention.

In a preferred implementation described herein, the system and method utilize a highly flexible architecture of the Windows® 2000 operating system, in which an administrator can link policies to containers which are hierarchically organized directory objects representing sites, domains, organizational units and policy recipients (e.g., groups of users and computers) thereunder. Thus, although not necessary to the present invention, the group policy system and method preferably utilize a Windows® 2000 directory service, known as Active Directory 60 (of a domain controller 62, FIG. 2), that stores information about the objects of a domain, and makes this information easy for administrators to access, find and apply via a single, consistent and open set of interfaces. For example, with Active Directory, administrators can access resources anywhere on the network. Similarly, administrators have a single point of administration for the objects on the network, which can be viewed in a hierarchical structure. A core unit in the Active Directory is the domain, and many of the objects of a network exist within a domain. A single domain can span multiple physical locations or sites. Notwithstanding, although described herein with reference to Windows® 2000, the Active Directory, sites, domains, organizational units, and so forth, the present invention is not limited thereto, nor even to directory containers in general, but rather is applicable to any containers capable of being linked to a policy object and having policy accumulated therefor.

Group policy settings may be created via a group policy editor 64 (a Microsoft Management Console snap-in or similar user interface), and these settings are ordinarily maintained in a group policy object (GPO) such as $66_1$. Group policy objects $66_1$–$66_n$ may store group policy information in locations including a group policy container and a group policy template. A group policy container is an Active Directory object that stores group policy object properties, and may include sub-containers for machine and user group policy information. Properties of a group policy container may include version information, which is used to ensure that the information is synchronized with the group policy template information, status information, e.g., whether the group policy object is enabled or disabled, and a list of components (e.g., extensions) that have settings in the group policy object. The group policy template is a folder structure preferably located in a system volume folder of the domain controller 62, and serves as the container primarily for file-based information, (e.g., scripts). The policy information may include one or more pointers to another location (e.g., a data file on a SQL server) where some or all of the actual policy information (or a further pointer thereto) is maintained. Policy information also may be stored in a virtual registry (e.g., a copy of some or all of a client machine's registry maintained in a file on the server, specifically in the group policy template), that may be used by an extension to put information into the client-machine's registry.

Figure 3:
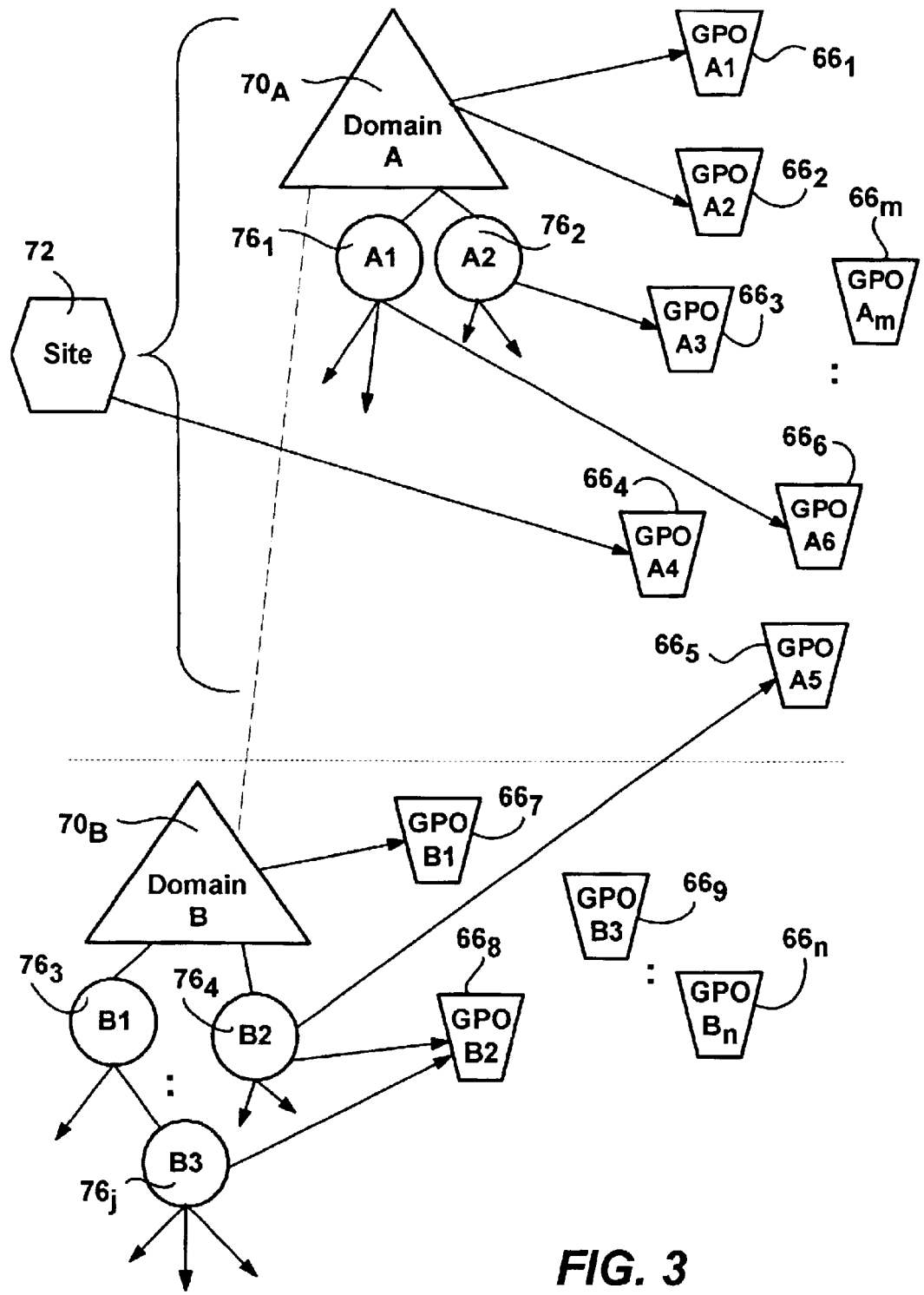
FIG. 3 is a block diagram generally illustrating hierarchical relationships between sites, domains organizational units and group policy objects of a network in accordance with one aspect of the present invention.

The group policy editor 64 or similar user interface tool (e.g., user interface 82) further allows an administrator to selectively associate the group policy objects with directory container objects $68_1$–$68_p$ (FIG. 2) such as those shown in FIG. 3, i.e., domains $70_A$ and $70_B$, sites (e.g., site 72), and/or organizational units $76_1$–$76_j$. A site comprises one or more ranges of IP addresses of which computers can be a member. Organizational units are a type of directory object included within domains that are logical containers into which users, groups, computers, and even other organizational units may be placed and hierarchically organized.

In accordance with aspects of the present invention, for each user of an organizational unit, the policy settings maintained in the policy objects $66_1$–$66_n$ may be selectively accumulated in an order of precedence, inherited from the group policy objects associated with one or more higher-up organizational units $76_1$–$76_j$, the site 72 and/or the domain (e.g., $70_A$), and/or blocked from being inherited. In general, in typical networks, the closer an organizational unit is to a user, the more likely that the administrator of that organizational unit will have a fair number of policies for that user. Mid-level policies are less likely to be present, and if present, are more likely to be suggested policy that may be blocked, as described below. Near the top of the hierarchy, very few policies are likely, but those that are present will be most likely important and thus enforced. Thus, to accumulate policy in a preferred implementation, policies are applied in a reverse hierarchical order, and higher non-enforced policies may be blocked, however higher policies that are enforced take precedence by hierarchical order.

Figure 4:
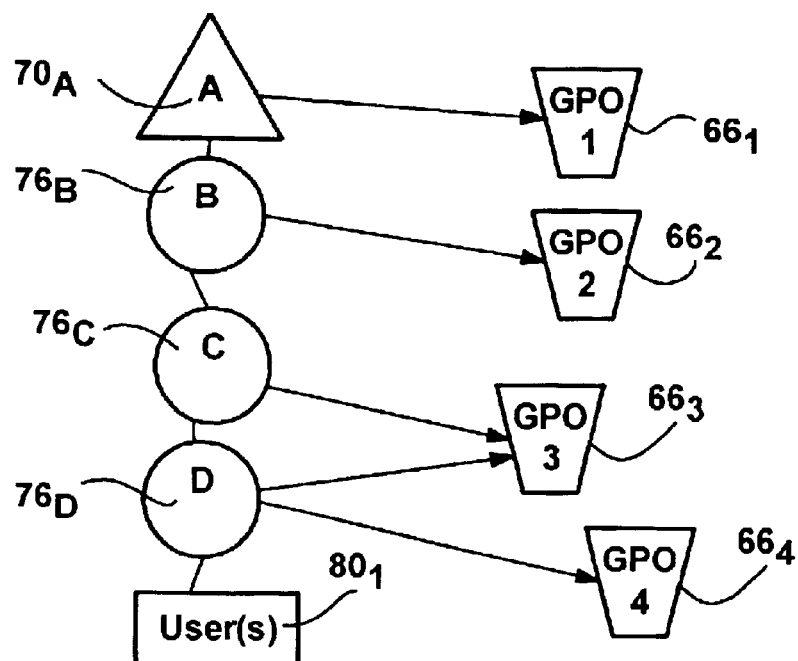
FIG. 4 is a block diagram representing how a user may fit under a number of hierarchically organized directory containers associated with group policy objects.

FIG. 4 generally shows the concept of accumulating policies, including ordering (within a directory container), inheritance and the blocking of inheritance. In FIG. 4, users $80_1$ that are members of organizational unit D ($76_D$) have a hierarchical chain of A, B, C and D. Such users may have policies accumulated from the group policy objects $66_1$–$66_4$ associated with containers as set by one or more administrators. In FIG. 4, the associations are shown by arrows from the directory containers A, B, C and/or D ($70_A$, $76_B$–$76_D$) to the group policy objects $66_1$–$66_4$. For example, a domain administrator may set properties such that the users will, by enforcement, inherit the policies from the group policy object or objects ($66_1$) associated with domain A ($70_A$). One or more administrators of the organizational units may set properties such that the users receive policies from group policy objects GPO3 (twice) and GPO4 ($66_3$, $66_3$, $66_4$), and have inheritance blocked from the non-enforced group policy objects above, e.g., group policy object $66_B$ associated with organizational unit B ($76_B$). The ability to order the group policy objects $66_3$ and $66_4$ within the directory container object (organizational unit D $76_D$) provides the administrator with a mechanism for handling conflicting policies, if any, within a directory container. At the same time, the hierarchy, in conjunction with enforcement and blocking options set by appropriate administrators, determine the final order among group policies applied to a user.

Figure 5:
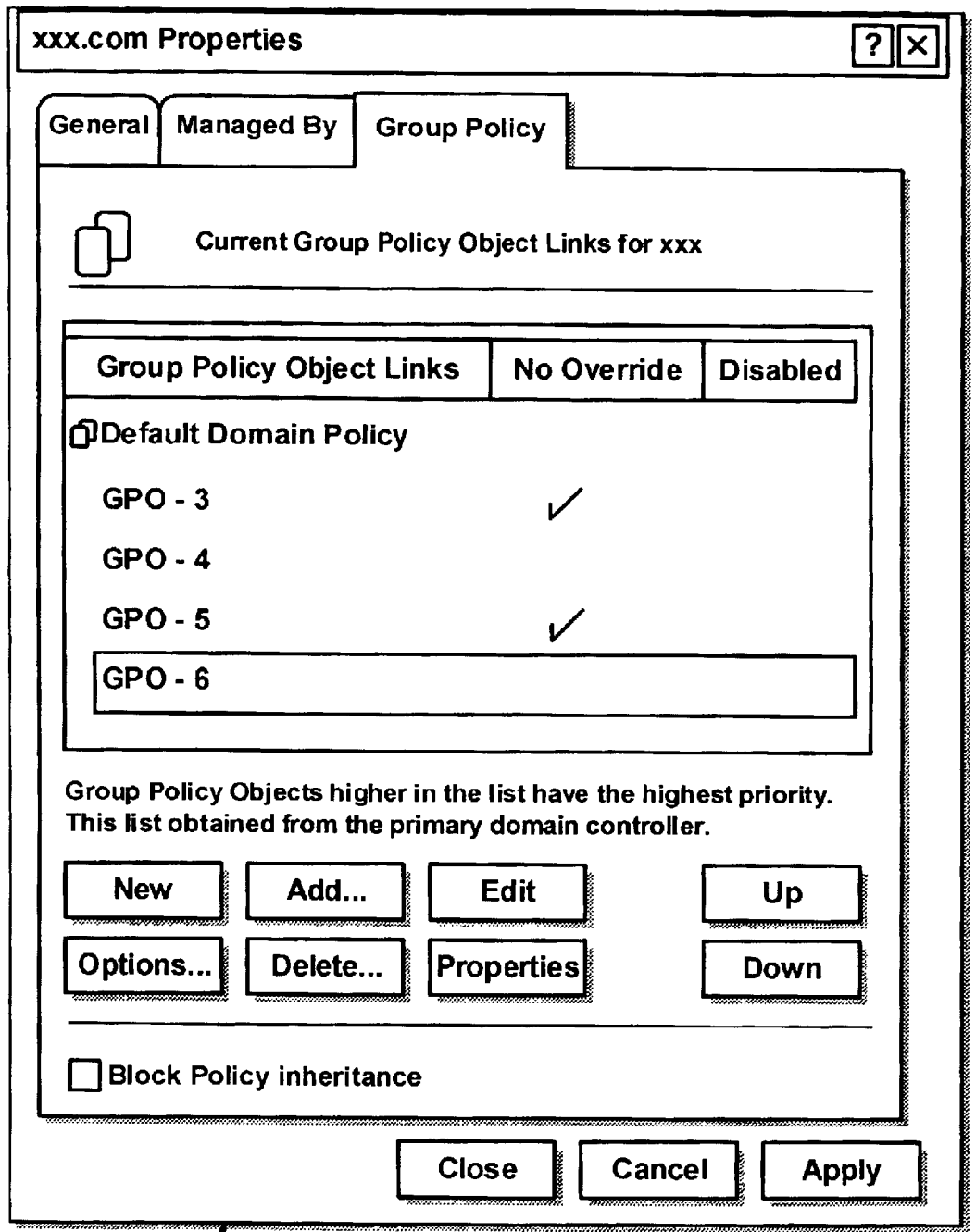
FIG. 5 is a representation of an exemplary user interface via which an administrator may associate group policy objects within the current Active Directory scoping.

To this end, as shown in FIG. 5, the administrator of a site, domain or organizational unit, is provided with a user interface 82 that essentially allows the administrator to configure the ordering of the group policy objects within the directory container, enforce selected policies (or not), and block inheritance (or not) of non-enforced policy objects above. The administrator at each level intuitively sets these rankings such as by clicking buttons, checkboxes or the like, within Active Directory and site management tools, (e.g., Active Directory Sites And Services and/or Active Directory Users and Computers). For example, in FIG. 5, the administrator may reorder the associated group policy objects, select "No Override," (i.e., "Enforce") for each of the group policy objects, and "Block" (via the blocking checkbox) those policy objects above that are not enforced. Policy objects that are not enforced may be considered suggested policy, in that suggested policy can be blocked by settings in lower-level directory container objects and the suggested policy settings essentially discarded. Where there is more than one group policy object associated with a directory container, the administrator of that directory container (SDOU) may order the group policy objects therein to determine relative strengths of each. Thus, for example, (not shown), domain A may have associated policies ordered A1, A2, A3 and A4, although such internal rankings are not known to administrators of the lower units, which see only a unified "A" policy.

With respect to FIG. 4, consider by way of example the chain A, B, C, D from highest directory container (object) to lowest, wherein the users $80_1$ under organizational unit D may receive policies from group policy objects associated with any or all of these containers. In the present example, for the users $80_1$, assume an administrator wants to have the policy object GPO1 (associated with the domain A) be the strongest, (in case of any conflict). One or more lower-level administrators (possibly the same administrator as the domain administrator) want GPO1's policy to be followed by GPO3, followed by GPO3 again, then by GPO4, then by GPO2, and lastly by any policies associated with the local machine (which is also allowed).

The administrators can achieve the desired order by enforcing domain A's associated group policy, ordering GPO3 above GPO4 within organizational unit D ($76_D$), and not selecting any blocking. The result, provided by an ordering mechanism 88 (FIG. 2) as described below, is essentially an ordered list of group policy objects (from weakest to strongest) of Local Machine, GPO2, GPO4, GPO3, GPO3 and GPO1 (strongest because enforced). The order determines how policy is applied during policy update events, e.g., machine boot or user logon, and in what priority policy is applied if there is a conflict. Note that the actual policy that results from applying one group policy object may depend on what occurred when a group policy object was previously applied. For example, a group policy object may act one way if a script has been previously run, and another way if the script was not previously run. As a result, the same group policy object may have different results for different users, depending on whether another group policy object which runs that script was previously applied to a given user. Further, note that a group policy object may influence its own actions if applied more than once to a user, e.g., GPO3 may be applied twice in the example shown in FIG. 4, and thus, for example, may do some action the first time that changes how GPO3 acts the second time.

Figure 6:
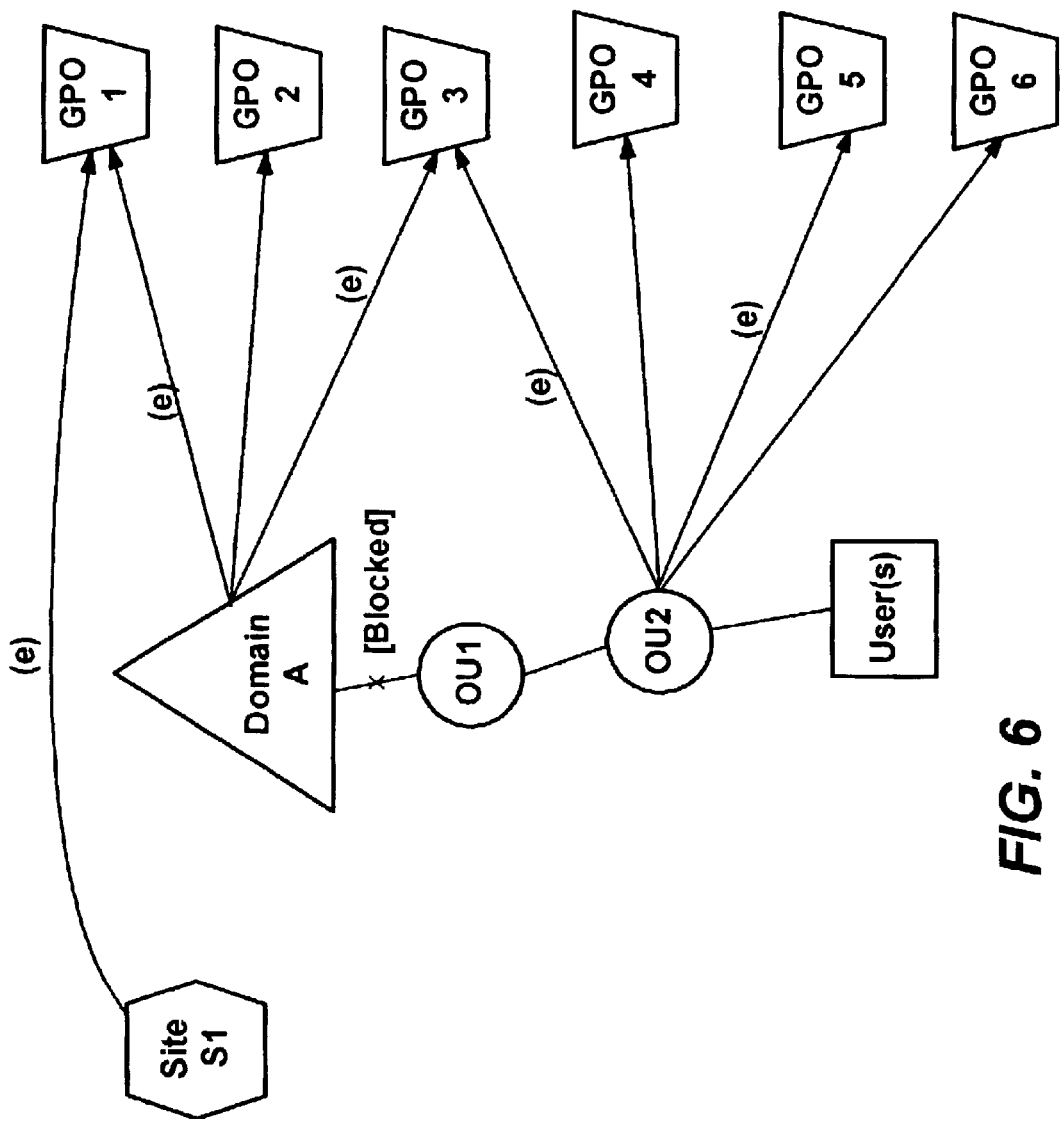
FIG. 6 is a block diagram representing a user under hierarchically organized directory containers associated with group policy objects.

FIGS. 5 through 9 provide an explanation of a suitable mechanism 88 (FIG. 2) and process therein for developing an ordered list 90 based on the choices selected by the administrator via the user interface 82 (such as the interface shown in FIG. 5). In FIG. 6, the user is under a Site S1, Domain A, and organizational units OU1 and OU2. In FIG. 6, arrows from the directory containers to the group policy objects show each of the associations, which are actually maintained as properties of the directory containers. Thus, the site S1 is associated with group policy object GPO1, the Domain A is associated with group policy objects GPO1, GPO2 and GPO3, while the organizational unit OU1 has no group policy objects associated therewith. The organizational unit OU2 has group policy objects GPO3, GPO4, GPO5 and GPO6 associated therewith. If more than one group policy object is associated with an organizational unit, a prioritized ordering of the group policy objects is also established. For purposes of simplicity, in FIG. 6, the higher a group policy object appears, the stronger it is relative to others associated with the same directory container. For example, with respect to organizational unit OU2, via the interface 82 (FIG. 5), the administrator has set GPO3 to be stronger than GPO4, which in turn is stronger than GPO5, and these are stronger than GPO6. Note, however, that the enforcement setting ultimately may change the relative strengths. Lastly, in FIG. 6, group policy objects that are to be enforced are shown with a parenthetical "(e)" therein, while blocking of suggested policy is shown by an "X" [Blocked] in the chain, e.g., between Domain A and OU1.

Beginning at step 700 of FIG. 7A, the lowest (closest to the user) organizational unit in the hierarchy, organizational unit OU2 for the user represented in FIG. 6 is selected. Step 702 determines if there is at least one group policy object at OU2's level, i.e., associated with the organizational unit OU2. In the present example of FIG. 6, four group policy objects (GPO3, GPO4, GPO5 and GPO6) are associated with the organizational unit OU2, whereby step 702 branches to step 704 where the highest ordered group policy object of this set, GPO3, is selected. Step 706 tests whether the selected group policy object GPO3 is to be enforced, (i.e., has its "No Override" option checked in the user interface), denoted in FIG. 6 by a parenthetical "(e)" above the arrow representing the association. Since GPO3 is enforced at this level, step 708 is executed, which places an identifier of the selected group policy object GPO3 at the top of a temporary enforce list 92, as shown in FIG. 8A. As described below, the temporary enforce list will be used to construct the master (ordered) list 90 of group policy objects for the user or users under OU2.

Step 712 then tests if there is another group policy object at this level that has not yet been handled. As shown in FIG.

Figure 8A:
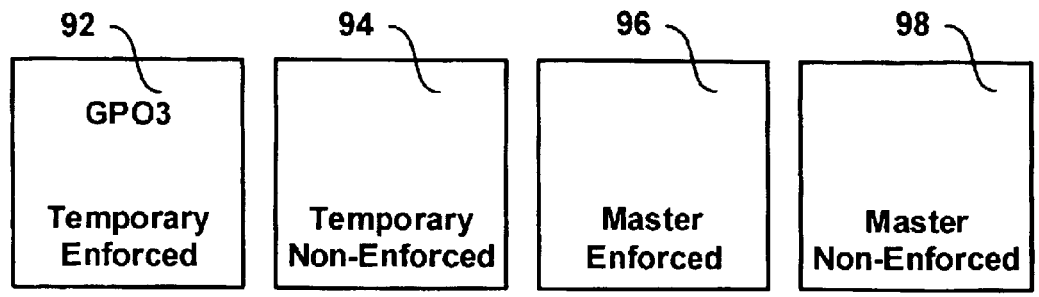
FIGS. 8A–8M are representations of lists of group policy objects being used to construct the ordered list of group policy objects in accordance with one aspect of the present invention.
Figure 8B:
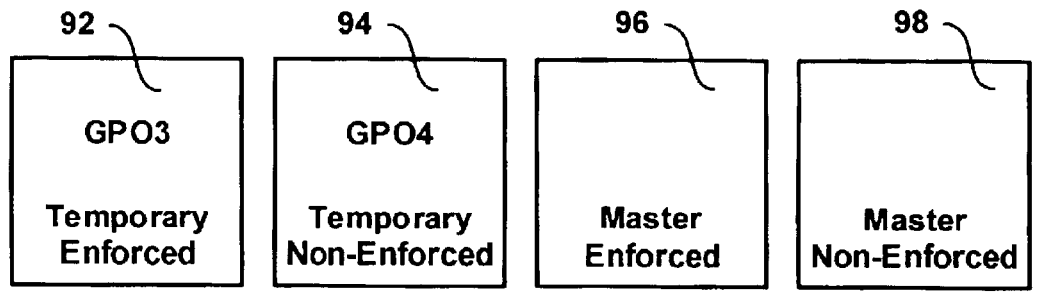
Figure 8C:
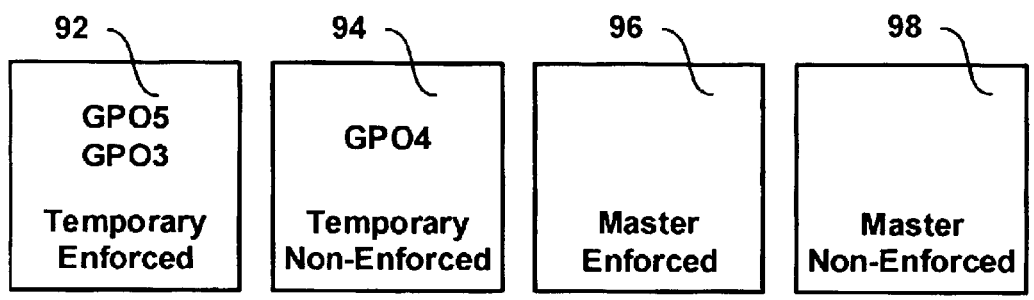
Figure 8D:
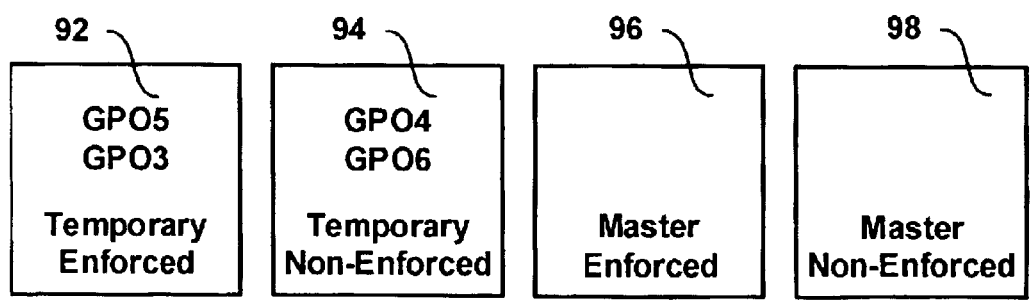

6, the group policy objects GPO4, GPO5 and GPO6 are also associated with OU2, and thus the step 714 selects the next-highest ordered group policy object, GPO4, before the process returns to step 706. The group policy object GPO4 is not enforced, and thus this time step 706 branches to step 710 wherein the selected group policy object, GPO4, has an identifier added therefor to the end of a temporary non-enforce list 94 (FIG. 8B). As can be understood by following the steps 706–714, the other two group policy objects, GPO5 (enforced) and GPO 6 (non-enforced) are placed into the temporary enforced list 92 and temporary non-enforced list 94, respectively, as shown in FIGS. 8C and 8D. Note that via step 708, the GPO5 identifier is entered above the GPO3 identifier in the temporary enforced list 92.

Figure 7B:
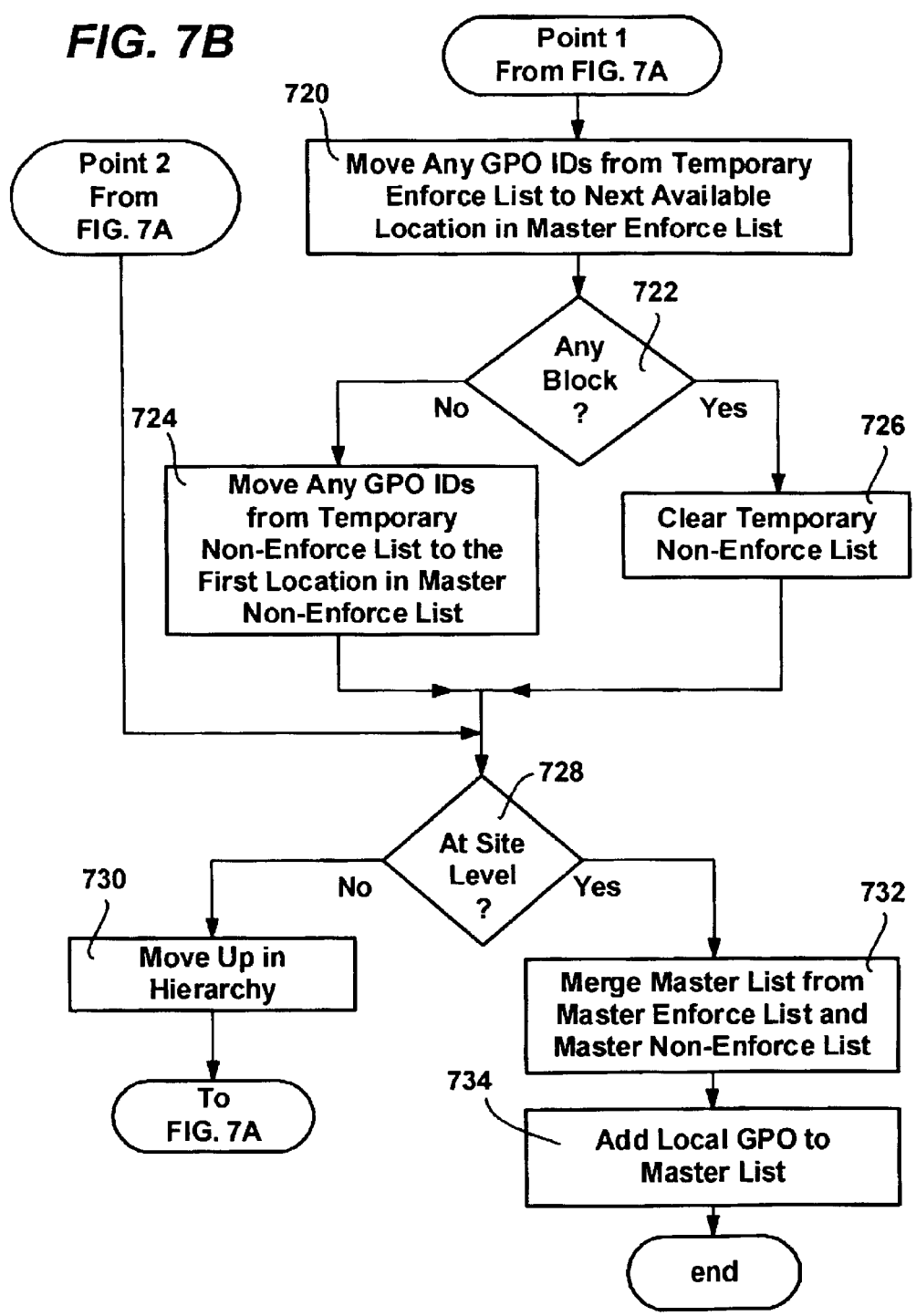
Figure 8E:
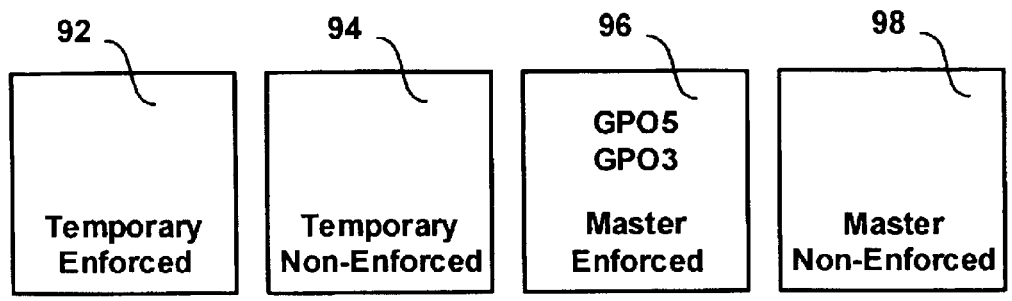
Figure 8F:
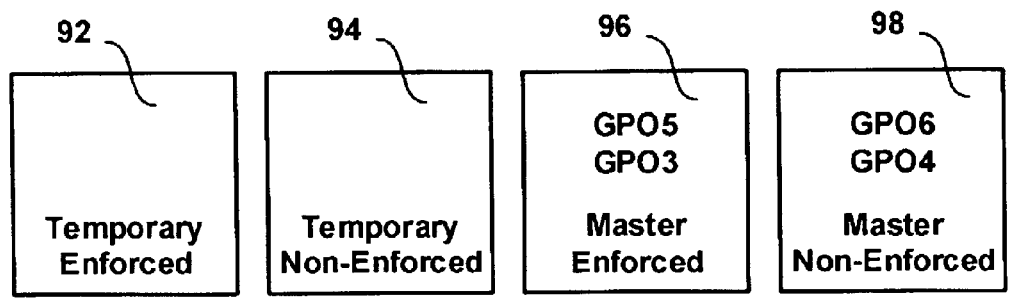

When there are no more group policy objects at the current level to place in the lists, step 712 branches to step 720 of FIG. 7B, where the group policy objects in the temporary enforce list 92 are moved to a master enforce list 96 as represented in FIG. 8E. The master enforce list 96 will accumulate the enforced group policy objects from the various levels, and will ultimately be merged with a master non-enforce list 98 to construct the master list 90. Step 722 then tests if blocking has been selected at any level below the current level. If blocked, non-enforced group policy objects will not be applied. However, in the present example, there is no blocking selected, and thus step 722 branches to step 724 where the group policy objects in the temporary non-enforce list 94 are moved to the front of a master non-enforce list 98 as represented in FIG. 8F. Step 728 then tests to determine if the current level is the uppermost level in the hierarchy of directory containers for the user, e.g., the site level. Since the current directory container is the organizational unit OU2, and not the site level, step 728 branches to step 730 which selects the next level up, i.e., the organizational unit OU1 in the present example of FIG. 6. The process then returns to step 702 of FIG. 7A.

At step 702, the properties of the organizational unit OU1 are examined to determine if there is a group policy object associated therewith. Since in the present example of FIG. 6 there is not, step 702 branches to step 728 of FIG. 7B where the site level is again tested for and found untrue. At step 730, the process then selects the next level up, the domain directory container, Domain A, and returns to step 702 of FIG. 7A to handle any group policy objects associated with the Domain A.

Figure 8G:
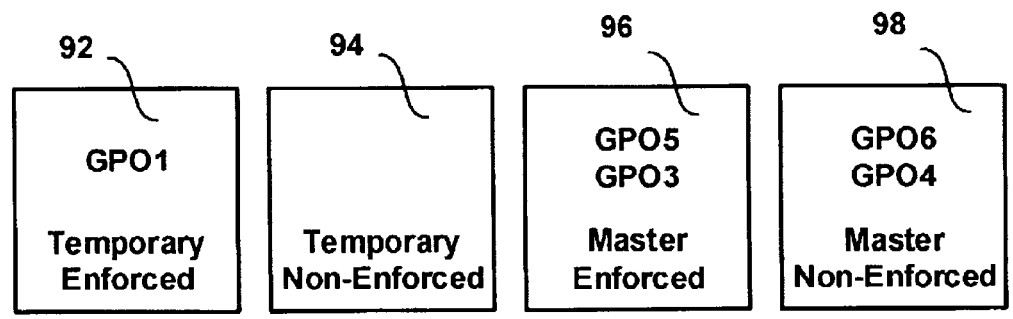
Figure 8H:
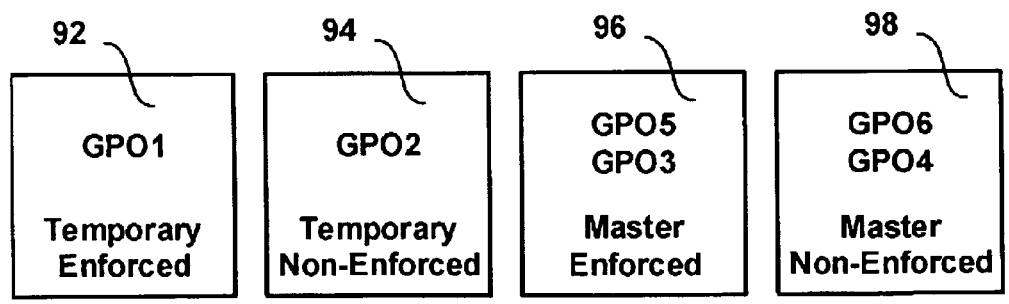
Figure 8I:
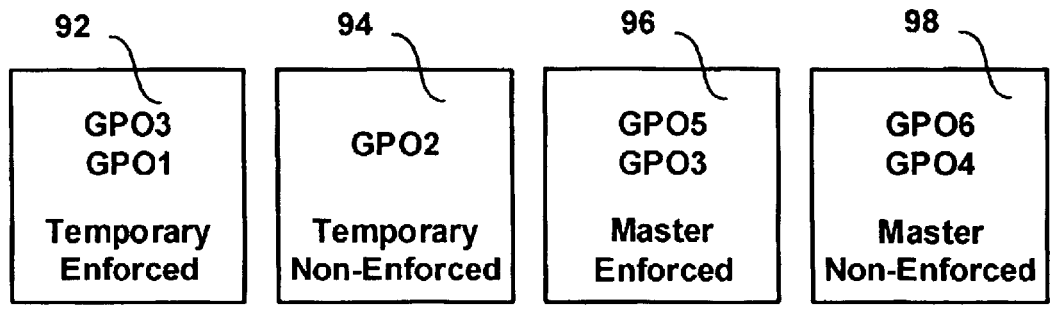

As shown in FIG. 6, Domain A has three group policy objects associated therewith, GPO1, GPO2 and GPO3. As understood from the above description, step 704 selects GPO1, step 706 determines that GPO1 is enforced, and thus step 708 inserts GPO1 into the temporary enforce list 92 (FIG. 8G). Steps 712–714 select the next strongest group policy object, GPO2 (non-enforced), after which steps 706 and 710 add a GPO2 identifier therefor to the temporary non-enforce list 94 (FIG. 8H). Next, steps 712 and 714 select GPO3 (enforced), and steps 706 and 708 insert it at the top of the temporary enforce list 92, as shown in FIG. 8I.

Figure 8J:
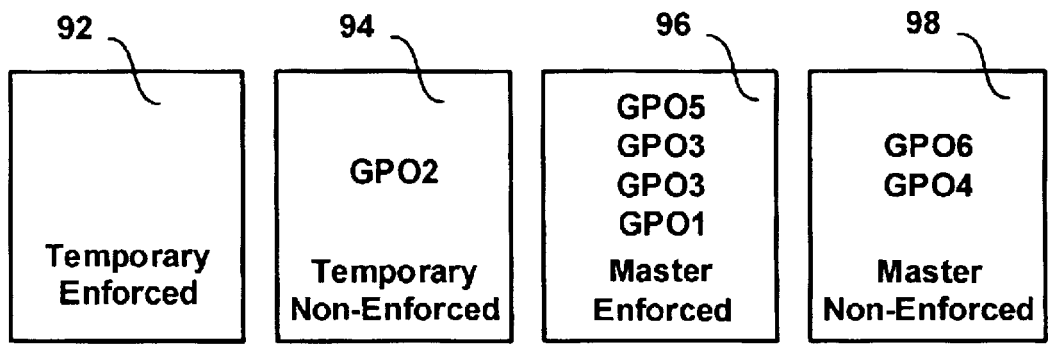

Step 720 of FIG. 7B next moves the GPO identifiers from the temporary enforce list 92 to the master enforce list 96. (FIG. 8J). Note that as shown in FIG. 8J, the master enforce list 96 is building (upwardly) the list of GPOs first by hierarchy and then by strength within the hierarchy. Non-enforced policy is handled in an inverse hierarchical order, although the strength within the hierarchy is still maintained. This is in accord with the overall concept of having enforced policy at higher levels win versus policy at lower levels, however lower-level policy wins over any higher level non-enforced (suggested) policy. In other words, a site-level administrator can thus enforce policy over a domain-level administrator, who can enforce policy over administrators of organizational units below (also hierarchically ranked). However, the lower-level administrators can discard any suggested policy from a higher level.

Figure 8K:
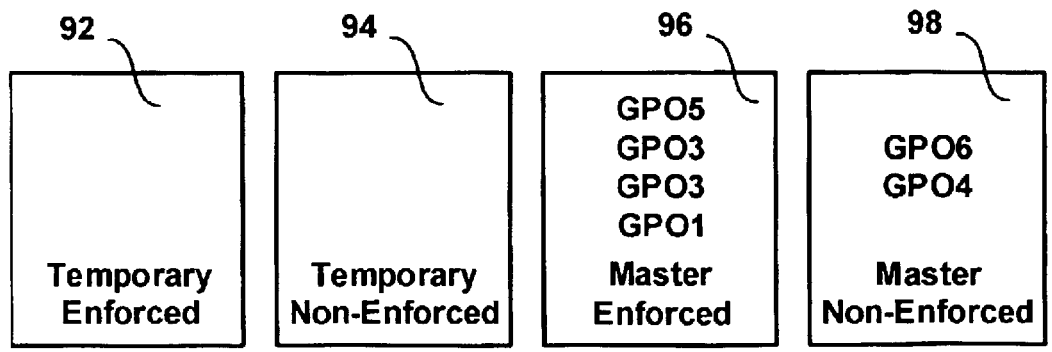
Figure 8L:
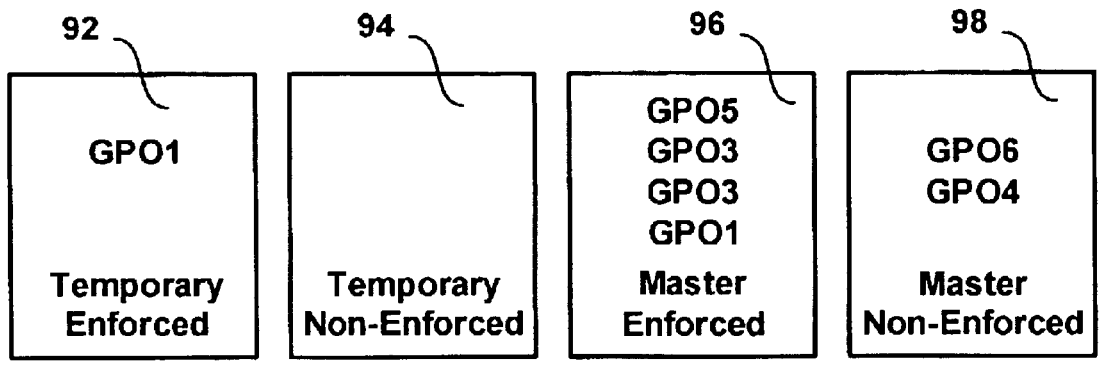

Step 722 then determines that the non-enforced policy settings are blocked below Domain A, (via OU1, e.g., there is a blocking flag set), as shown in FIG. 6 by the "X" between Domain A and OU1. Blocking is directed to preventing inheritance from non-enforced group policy objects associated with directory objects (sites, domains, and organizational units) above. As a result, there is no blocking on the same hierarchical level, i.e., GPO6 could not block GPO4. In general, this means that any non-enforced (suggested) policy above OU1 will be discarded. To accomplish this, step 722 branches to step 726 which clears the temporary non-enforced list 94, without adding any entries therein to the master non-enforced list 98, as shown in FIG. 8K. Note that had OU2 blocked inheritance from its parent containers, Domain A's non-enforced policy objects would similarly have been discarded, i.e., any blocking below a directory container blocks that directory container's associated group policy objects that are non-enforced, as well as any non-enforced group policy objects associated with higher-level directory containers. Step 728 again determines that the process has not yet handled the group policy objects (if any) at the site level, and moves up in the hierarchy, this time selecting the site directory container S1 at step 730.

Figure 8M:
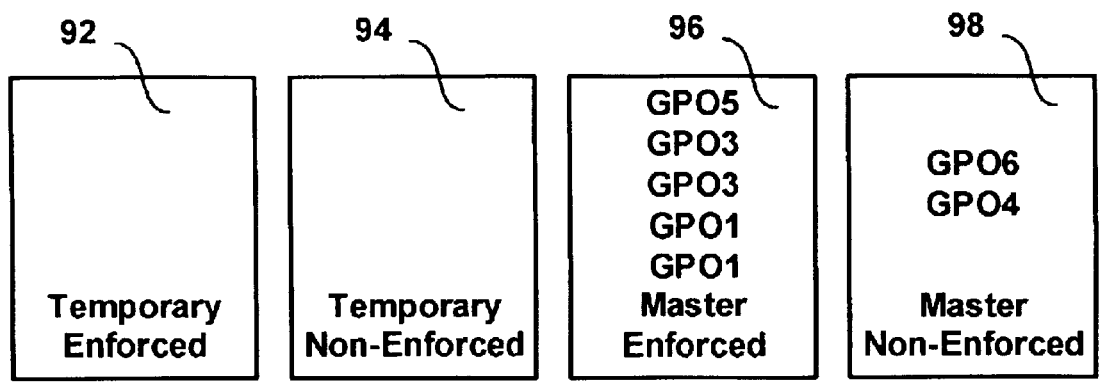
Figure 9:
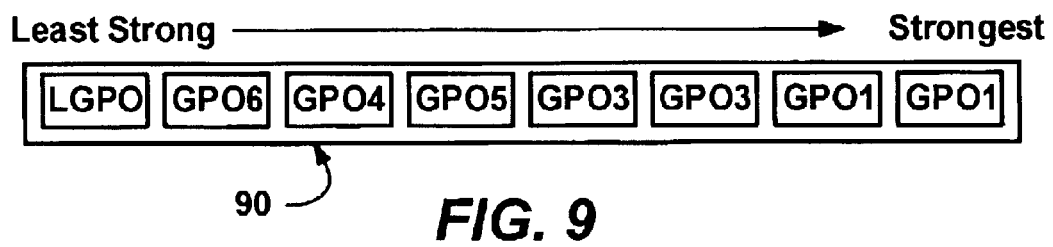
FIG. 9 is the ordered list of group policy objects constructed for the user represented in FIG. 6 in accordance with one aspect of the present invention.

As is understood from the above-described steps, the site's associated group policy object, GPO1 in the present example of FIG. 6, is enforced, and is thus added by step 708 to the temporary enforce list 92 (FIG. 8L), and then moved by step 720 to the master enforce list 96 (FIG. 8M). This time, step 728 determines that the process has handled the GPOs for this user, i.e., has finished building the master enforced list 96 and master non-enforced list 98. Step 732 then merges the lists into the master list 90 by writing the weakest GPO identifiers from the left to the right in order of strength. Lastly, step 734 adds any local machine policy, as the least strongest policy (because by rule it cannot be enforced) as shown in FIG. 9. To this extent, the local policy may be considered the top of the hierarchy, however it is not allowed to enforce, otherwise it would be the strongest policy, defeating the purpose of setting policy from a centralized location. Note that it is alternatively feasible to allow the local machine policy to be blocked, whereby in the present example the LGPO identifier would not be added to the master list 90 (FIG. 9). A higher policy setting may be used to control whether the local machine policy may be blocked or will be applied regardless of blocking. Further, note that it is also alternatively feasible to have the local machine policy not be processed, by default, unless a higher policy allows the local machine policy to be processed. Multiple local machine policy objects, with an ordering among them, are also feasible. Local machine policy is particularly useful for standalone machines that are not part of a domain. Security descriptors (e.g., including Discretionary Access Control Lists, or DACLS), described below, in conjunction with local machine policies provide for different groups of users having different policies on standalone machines.

Thus, as expected from an analysis of FIG. 6, the site's enforced policy, GPO1, is strongest in the master ordered list 90, followed by the domain's enforced policy objects (GPO1, GPO3 as ranked by strength within that level), followed by OU2's enforced policy (GPO3, GPO5 as ranked by strength within that level). The non-enforced policy is less strong, ordered as GPO4, GPO6. Note that alternatively, if there was no blocking selected, the order would have read, from weakest to strongest, Local Machine policy object(s), GPO2, GPO6, GPO4, GPO5, GPO3, GPO1.

At this time the ordered list 90 of policy objects is complete, and the policies now may be applied to the user or users of OU2 and/or the machine on which the user is logging on. It should be noted that the machine policies are applied to the machine when the machine operating system is booted, while the user group policies are applied when a user of the group logs on. In addition, group policy may be processed periodically, (a default time of ninety minutes, factoring in a thirty-minute variable offset to distribute the network and server load, wherein both times may be changed by a policy), so that policy changes are updated on machines that are not frequently re-booted and for users that do not frequently log off.

Once the ordered list 90 of policy objects is complete, at least one client extension 100 is typically called (e.g., by a desktop management engine 102, FIG. 2) and the list 90 provided thereto to be processed in any way the client-side extension 100 deems appropriate. Indeed, because the group policy objects may contain virtually any type of information, and because the information therein and the list 90 may be used by a client extension 100 in any desired way, the system and method of the present invention are highly extensible. Typical examples of how the list 90 is used is to determine which security settings apply to a user or machine, (e.g., access rights and/or group memberships), determine whether one or more user folders are redirected to the network, and so on. Scripts may be processed according to the ordered list 90, for example to apply policies that determine which applications will be centrally deployed (assigned, published and/or installed) to users and machines of a network, as described in U.S. patent application Ser. No. 09/158,968.

Figure 10:
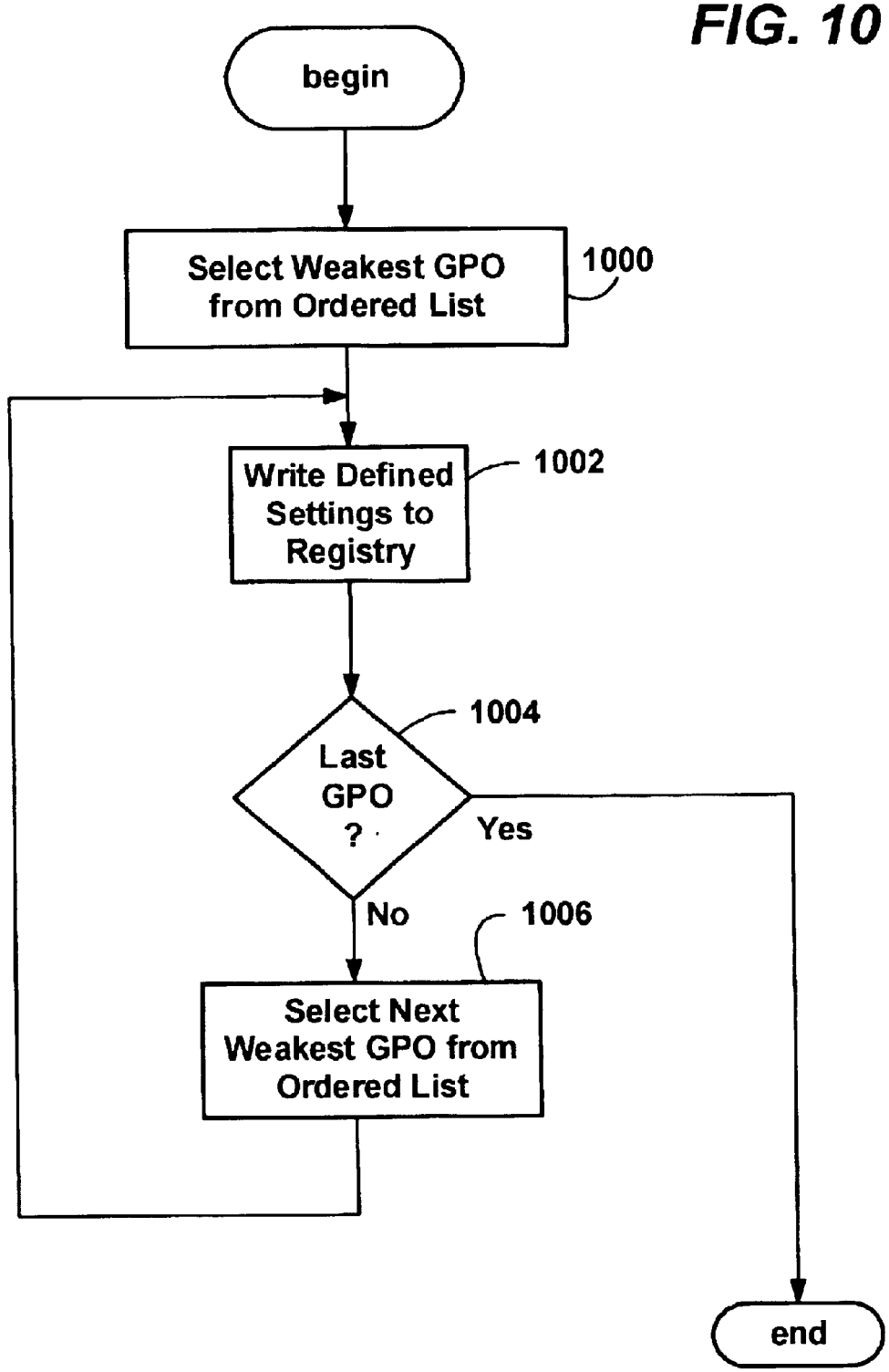
FIG. 10 is a flow diagram generally representing the steps taken to apply policy to a registry during policy update events (e.g., machine boot or user logon) based on an ordered list.

Another typical way in which policies are applied is to have at least some of the settings of the policy objects written to the registry of the user's machine. Applications and the like may then check the appropriate registry locations before taking certain requested actions, in order to perform or not perform the action according to the policy setting, (or some default value if no policy is defined for a particular setting). By way of example, FIG. 10 shows one way of placing policy into a user's machine registry, using registry APIs for writing thereto. In general, a policy setting may be defined or not defined, and if defined, has some value for its setting. Thus, defined policies are written into the registry from weakest to strongest based on the ranked list 90 of group policy objects, whereby stronger group policy objects write defined policy settings over the settings of weaker policies, i.e., last writer wins. To this end, at step 1000, the weakest policy object in the list 90, i.e., the LGPO (local group policy object) is selected. Then, at step 1002, each registry-based setting that is defined is written to the registry. Step 1004 then tests to see if all the group policy objects have been handled, which at this time is not true, and thus step 1004 branches to step 1006 to select the next weakest group policy object, "GPO6" from the list 90. Step 1006 then returns to step 1002 to write the defined settings of "GPO6" to the registry. The next weakest group policy object, "GPO4" is selected at step 1006, which then returns to step 1002 to write the defined settings of "GPO4" to the registry, and so on, until the group policy objects in the list are handled. Note that undefined policy settings are not written, whereby any defined policy settings remain intact in the registry. Thus, for example, if GPO6 had an Internet access policy bit setting of 1 (Allowed), and GPO4 had no opinion on Internet access, then the "allowed" setting from GPO6 remains (unless subsequently overwritten by defined GPO5, GPO3 or GPO1 policy). In this manner, policies are accumulated and combined in an ordering determined by the administrators.

Still another way in which policy may be applied to a user is to maintain the ordered list 90 of group policy objects in association with a user/machine, and then walk through the list from strongest to weakest seeking a defined policy setting that satisfies a pending action request. For example, the various applications and settings therefor available to a group need not be written into the registry for each user, but rather maintained in the group policy objects. If the user wishes to run an application, the process attempting to run the application uses the list to first look to the strongest policy object to see if the action is allowed or denied, and if undefined, continues by querying the next strongest policy object in the list 90. The process will continue walking through the list 90 until an answer (e.g., allow or deny) is obtained, or until there are no more policy objects in the list to query, at which time a default answer may be used.

Additional features of group policy objects are also provided to facilitate administrator control over their operation. First, an association between a directory container and a group policy object may be disabled, e.g., via an administrator selection (FIG. 5), whereby the group policy object is not applied to users for that particular directory container. However, this is not the same as removing the association of the group policy object with the container, because the group policy object still appears (in a disabled state) in a list of group policy objects seen by the administrator via the user interface.

Another feature is that a group policy object includes both computer settings (HKEY_LOCAL_MACHINE) and user (HKEY_CURRENT_USER) settings, which may be separately disabled. Such disables are global, i.e., they apply to all links thereto, whereby all users under a directory container associated with the group policy object will not get the disabled portion or portions of the group policy object. For example, an administrator may disable the computer or user settings if either portion is not needed, providing a performance improvement. Similarly, an administrator may use this type of disabling to debug a group policy object problem, e.g., by turning off one portion of the group policy object at a time to determine which portion causes a problem.

Figure 11:
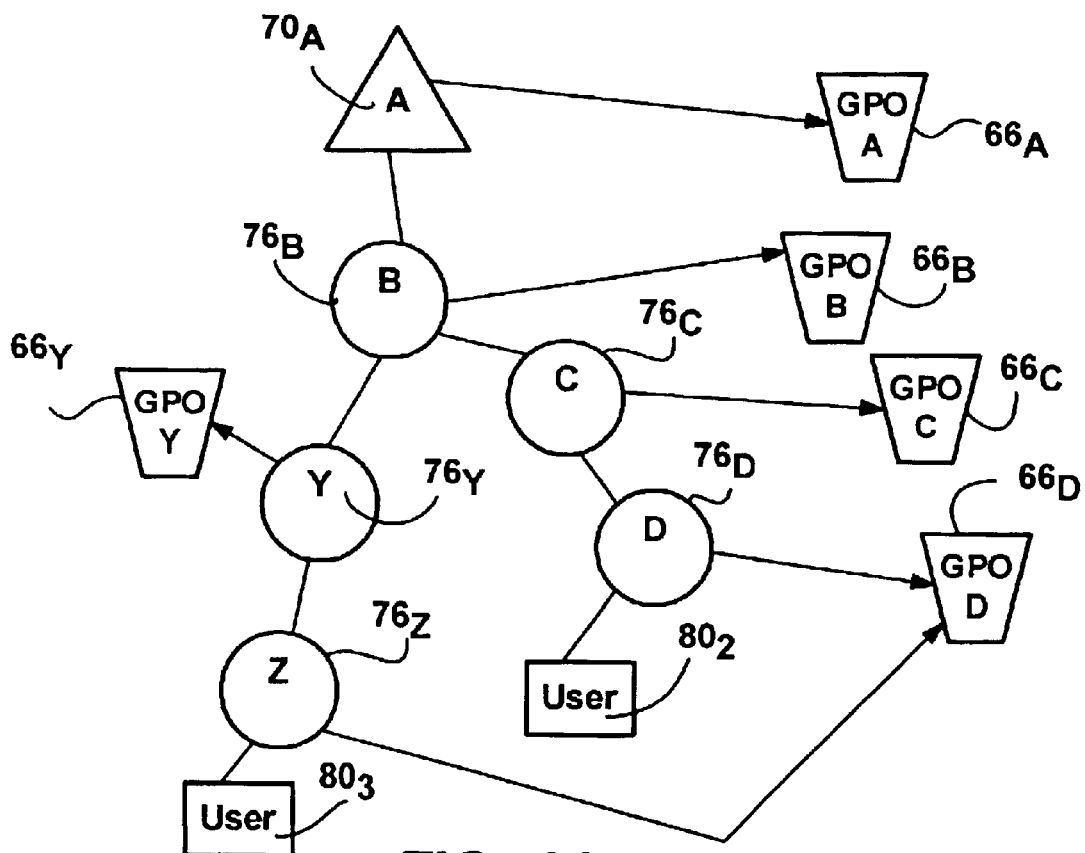
FIG. 11 is a block diagram representing how users may fit under hierarchically organized directory containers associated with group policy objects wherein one of the organizational units is linked to another.

The present invention also provides additional flexibility with respect to administering policy in a number of other ways. First, as described above, since group policy is maintained in objects, the containers may link to more than one group policy object and the group policy objects may be shared by multiple directory objects (containers), i.e., the same group policy object may be applied to multiple sites/domains/organizational units. For example, as shown in FIG. 11, user $80_2$ receives policy from the chain A, B, C, D, in a hierarchical order with enforcement and blocking possible as described above. However, the user $80_3$ under organizational unit $76_Z$ shares the group policy object $66_D$ with organizational unit $76_D$, rather than having an independent group policy object defined therefor, whereby the user $80_3$ receives policy from the chain A, B, Y, Z, which is effectively A, B, Y, D. Linking is valuable because it means only one set of policy settings needs to be maintained for possibly many groups of users under different hierarchies, e.g., a change to the setting of any group policy object is potentially implemented in multiple groups. For example, the sales-related policy for an enterprise's East Coast sales group may need to be the same as the policy for its West Coast sales group, however other non-sales policy may be different for the groups. Placing the sales-related policy into a shared group policy object ensures that the sales policy is consistent throughout the enterprise. Note that linking and associations with group policy objects may occur across a domain boundary as shown in FIG. 3, i.e., organizational unit B2 ($76_4$) is associated with the group policy object A5 ($66_5$).

Each policy object may also handle exception management in order to include or exclude certain users or groups of users from certain policy. To this end, each policy object may include an exclusion list of users and groups to which the policy will not apply and/or an inclusion list of users and groups to which the policy will apply. This is accomplished via the security descriptor associated with each object. An administrator may specify which groups of users and computers have "Apply Group Policy" access control entries in the security descriptor to determine access to the group policy object. In general, groups that have Apply Group Policy and read access to the group policy object receive the group policies therein, while groups that do not have Apply Group Policy or read access to the group policy object do not get the group policies therein. Note that security descriptors include one or more security identifiers and a bitmask of rights associated with each security identifier, and are capable of handling both inclusion and exclusion. For example, within a research group, certain users may be given a different Internet access policy than other users, e.g., via the security descriptor, apply the policy to listed users A, B and C, but no others in the group. Alternatively, via the security descriptor, the policy is applied to all users in the research group except X and Z who are specifically denied access to this policy object. This enables policy to be tailored to individual users without having to construct many separate groups to handle the various exceptions that typically arise in enterprises. Further, policy may be enforced for certain users and suggested for other users by splitting a groups policies into two groups, (e.g., Ae and A), and then using security access control to select which users in that group get which policy.

Another aspect of the present invention enables policy based on the machine's physical location, in addition to the user's logical function (reflected in the user's membership in various groups). In other words, policy may be made network topology aware. This is accomplished by associating a group policy object (e.g., $66_4$) with a site 72, as shown in FIG. 3. In this way, a user logging on in Europe may be given different policy settings than that same user logging on in the United States. The other aspects of the present invention, including layering (ordering), inheritance, blocking, linking and exception management are applicable to the group policy object or objects of a site, and thus a site's policy object or objects may fit anywhere within the ordered list.

Figure 12:
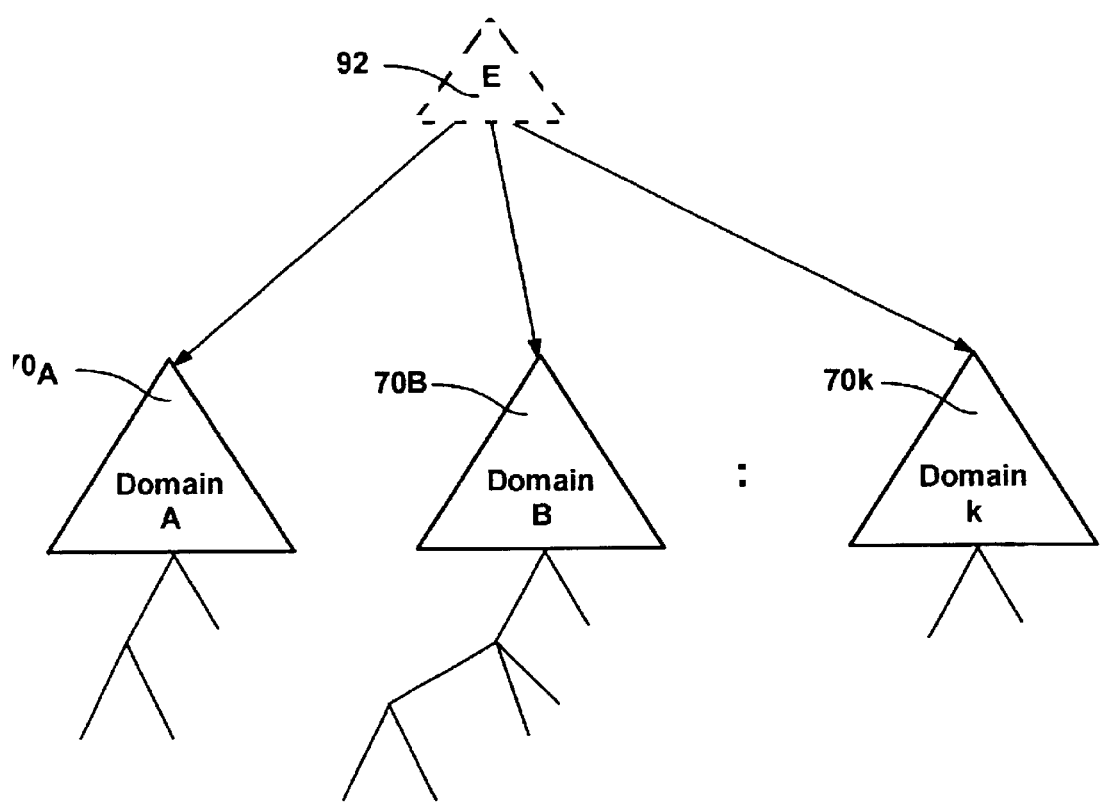
FIG. 12 is a block diagram representing how domains may receive enterprise policy.

The present invention also provides for an enterprise policy, a policy that is applied to all domains. FIG. 12 shows a number of domains $70_A$–$70_K$ under an enterprise 92. In this model, domains may be placed under the enterprise, whereby the policy settings of the enterprise are propagated through the domains via inheritance. Moreover, as described above, a number of domains may share a group policy object to achieve a similar effect.

Moreover, in keeping with the invention, the desktop management engine 102 (FIG. 2) may further facilitate the use of group policy objects by the client-side extensions 100, primarily to enhance performance. A first way in which performance may be enhanced is by separating the various client-side extensions 100 by functionality (e.g., one for handling registry-based settings, one for scripts, one for security policy settings and so forth), whereby each extension may receive a customized ordered list 90 listing only those group policy objects that are relevant thereto. In other words, rather than generate only one ordered list 90, the desktop management engine 102 may generate a plurality of such lists, one for each extension, each list customized, applied and maintained on a per-extension basis. For example, an extension may be interested only in security policy, whereby group policy objects that have no security policy therein need not be part of the ordered list received by that extension. An attribute in each of the group policy objects lists the extensions that have settings therein, whereby the desktop management engine 102 knows which of the extensions 102 are interested in which group policy objects, and each extension receives in its ordered list only those group policy objects that are tagged with that extension's identifying information.

The desktop management engine 102 monitors for various types of events and notifies appropriate extensions of those events, whereby the extensions 100 may reapply the policy. A first type of event occurs when some change is made to the order of the group policy objects in the ordered list 90 with respect to each affected extension. For example, an administrator may remove (or add) a group policy object, whereby a new ordered list is generated for each extension. The new list is compared with the previous list for each extension to see if the list has changed for that extension, whereby the relevant extensions are separately called upon such a change, e.g., when policy is updated. To this end, the desktop management engine 102 saves the previous ordered list of group policy objects for each extension and compares it to the new list, taking into consideration which changes are relevant per extension.

Figure 13A:
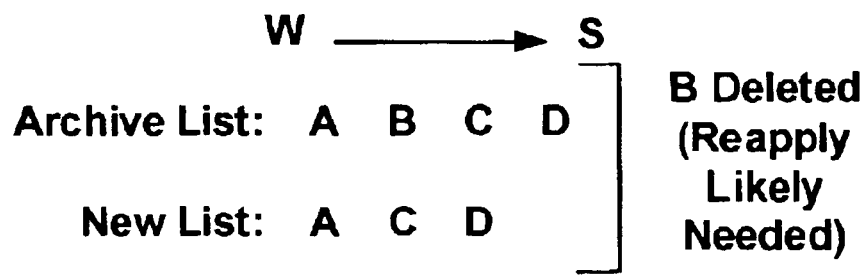
FIGS. 13A–13C represent some of the ways in which an ordered list of group policy object may be changed and an extension notified of change information.

By way of example, as shown in FIG. 13A, group policy object GPOB has been removed from a previous list GPOA, GPOB, GPOC, and GPOD, causing a new list of GPOA, GPOC, and GPOD. Each extension tagged in GPOB is then called with the change information (i.e., GPOB was deleted), and also passed the new list. The called extensions can act on this information, such as to do what is necessary to clear out GPOB's policy settings, and thereafter typically reapplies the new list (GPOA, GPOC, GPOD), although theoretically, the extension need not reapply the new list if it was intelligent enough to know that GPOB had only some isolated policy settings. Note that dependencies among the group policy objects may be changed, however, so policy according to the new list is ordinarily reapplied.

To remove (or add) a group policy object from a list, the administrator may not actually remove (or add) the group policy object from a container, but may effectively remove (or add) the group policy object (e.g., GPOB) with respect to an extension. For example, the administrator may nullify all security settings from a group policy object, whereby that GPOB policy object is no longer relevant to the client-side security extension and is removed from the ordered list (GPOA, GPOC and GPOD) received by the security extension. However, GPOB may still be relevant to other extensions such as script and registry extensions, whereby those extensions receive (if necessary) the full ordered list, GPOA, GPOB, GPOC, and GPOD. Another reason that a GPO may be removed from (or added to) a list is that an administrator may change a user's security rights. For example, an administrator may change a user's security rights such that the user no longer has access to a group policy object. In such an event, the group policy object is removed from each of the ordered lists in which it is identified. Similarly, if security is changed to give a user access to a group policy object, that group policy object is accumulated in new appropriately-ordered lists for the user.

Figure 13B:
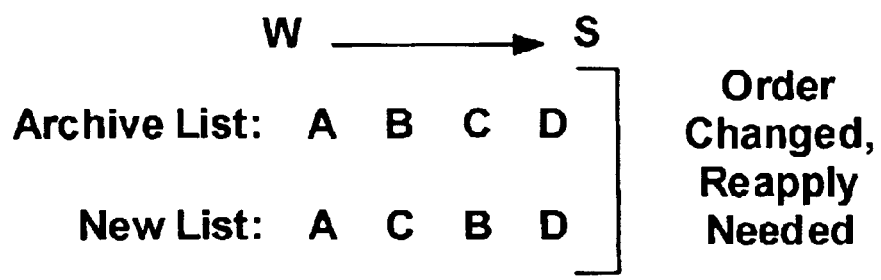

FIG. 13B shows another type of change, wherein the administrator reorders the policy objects, e.g., GPOA, GPOB GPOC and GPOD to GPOA, GPOC, GPOB and GPOD. Because of dependencies (e.g., among scripts) and other order-related settings (e.g., last-writer wins in the registry settings) as described above, the extensions that use these group policy objects are called to be made aware of such a reordering, so that each such extension can reapply the group policy objects in the new order.

Figure 13C:
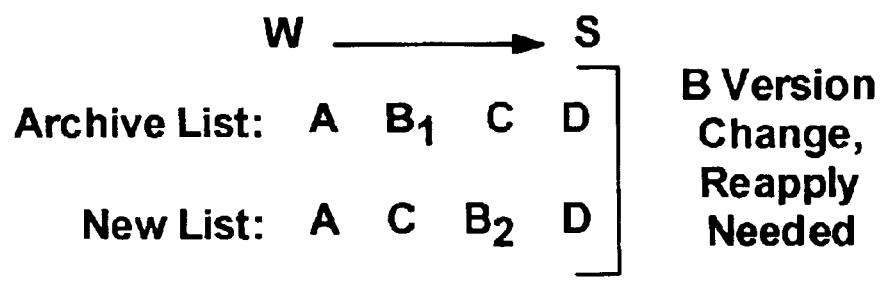

As represented in FIG. 13C, another change occurs when the information in a group policy object changes, as tracked by a version number. In FIG. 13C, an applied version of GPOB, $GPOB_1$ has been changed to version $GPOB_2$, and the extensions that deal with GPOB need to be called with the change information so that $GPOB_1$'s policy is removed and the new policy in $GPOB_2$ is applied. Because of possible dependencies among the group policy objects, the extensions generally reapply the entire new list.

Another change which extensions may register for notification of is changes to group membership. In general, whenever an administrator changes a user's membership in a group, e.g., by removing the member from a group or adding the member to a new group, the group policy desktop management engine 102 calls each extension registered for notification of this type of change. Because group memberships under directory containers determine which policy objects apply, each called extension will ordinarily reapply policy in response to the call, although the actual action taken by the extension is up to the extension.

Another factor that may be used to influence how group policy is applied is the rate at which data may be transferred. For example, if a link is slow, then certain policy information such as registry settings are applied, but other policy-related events such as software installations are not applied (because they would take too long), e.g., if scripts are not applied due to a slow link, the script extension may clear the scripts. More particularly, registry-based polices and security settings are applied by default (and cannot be turned off), while other policies are not applied by default. Other than the registry and security settings, another policy setting may specify whether the behavior should apply for slow links.

At each policy update, (which requires an IP connection) the data transfer rate is evaluated, as described below. Whenever a change from a slow to fast or fast to slow link is detected, a link transition flag indicating a change in the rate, along with a link rate flag (slow or fast), are used to call appropriately-registered extensions to provide the information needed to adjust for the link's data transfer rate. Of course, a finer distinction among rates may be provided other than simply fast or slow, e.g., relatively small software installations may take place for medium or fast connections, but not over slow connections, however a straightforward distinction between fast and slow is presently implemented.

Figure 14A:
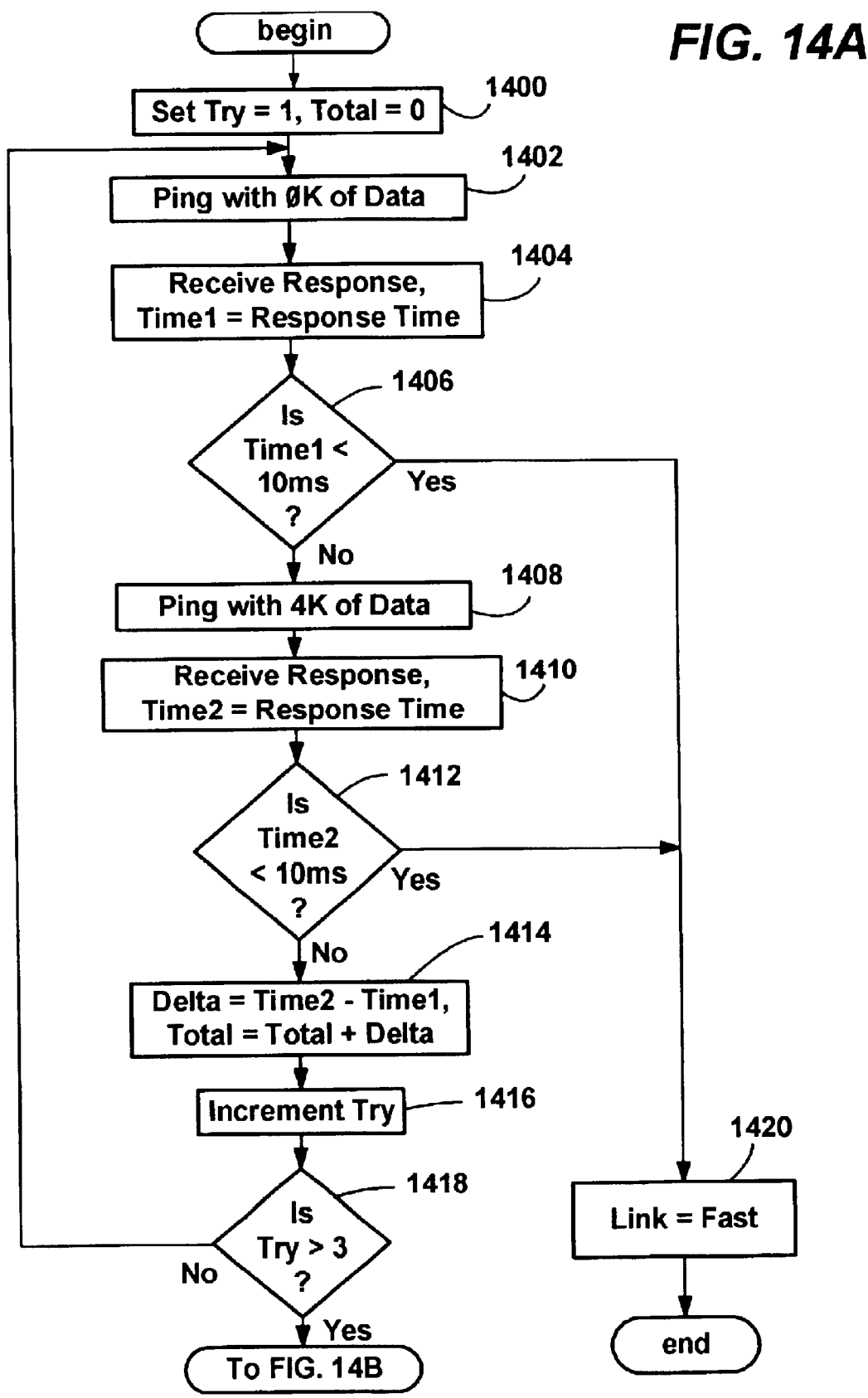
FIGS. 14A–14B comprise a flow diagram for determining a slow or fast link, including determining a data transfer rate, for changing how group policy may be applied.
Figure 14B:
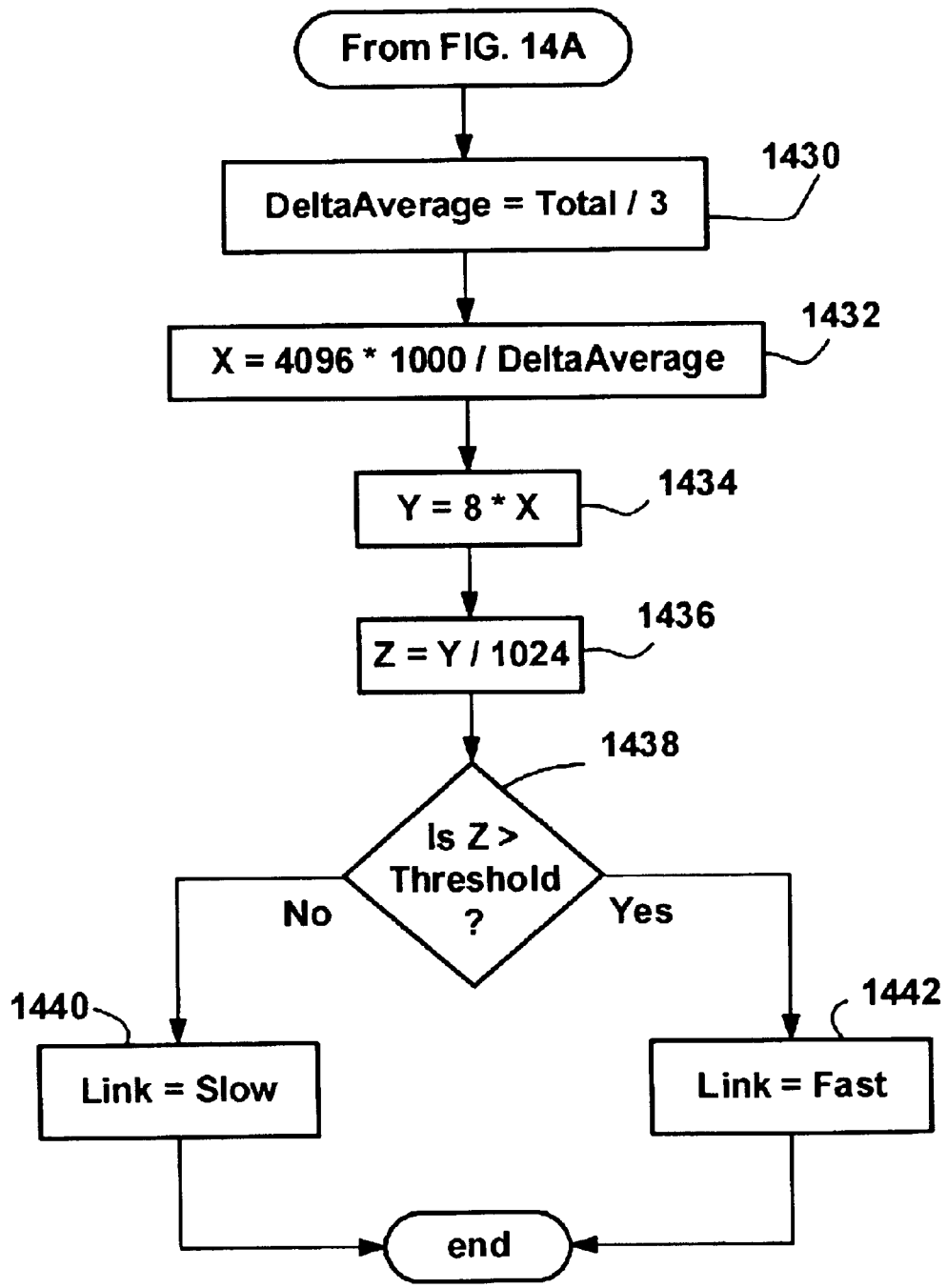

To determine the connection rate, each client machine generally follows the steps set forth in FIGS. 14A–14B. First, at step 1400, two variables, a loop counter (Try) and a transmission time counter (Total), described below, are initialized to zero. Then, at step 1402, the domain controller is pinged over the link with no (zero bytes) of data. When the response is received at the client, step 1404 records the time, e.g., sets a variable $Time_1$ to the amount of time it took to receive the response. If at step 1406 the response (round trip) time is rapid, e.g., less than ten milliseconds, then the connection is known to be fast, whereby step 1406 branches to step 1420 where the flags are adjusted as necessary and the process ends. Extensions registered for link transitions may be called at this time, e.g., if the link was previously slow. Note that if the ping timed out without a response, this value is not valid and is discarded, e.g., the process branches ahead to step 1416 (not shown).

If at step 1406 a response was received and took longer than ten milliseconds, there may be a number of reasons why the response was slow, including that the connection is slow, or that the domain controller was temporarily busy. Thus, rather than assume the connection is slow, an actual data transfer rate is calculated, by looping up to three times, while discarding any clearly invalid values and averaging to balance any temporary anomalies. To this end, step 1406 branches to step 1408 where the domain controller is again pinged, this time with four kilobytes (4096 bytes) of data. At step 1410, the response time is recorded in a second variable, $Time_2$, (provided the ping did not time out, whereby the process would effectively discard this invalid value and also $Time_1$, e.g., by branching ahead to step 1416, not shown) If the response time took less than ten milliseconds as determined at step 1412, then as described above, the connection is considered to be fast, whereby step 1412 branches to step 1420 to adjust the link rate as necessary, after which the process is ended.

If the response again took more than ten milliseconds, step 1412 branches to step 1414 where the difference between $Time_1$ and $Time_2$, Delta, is calculated and, if the result is valid, is added to a Total. Another example of an invalid result is one in which the result is negative, i.e., the four-kilobyte transfer time ($Time_2$) was smaller than the zero data transfer time, ($Time_1$). Because $Time_1$ corresponded to the time to transfer no data, under ordinary circumstances $Time_1$ represents the time taken for overhead in the ping/response operation. In an ordinary case, the overhead time will be the same for the subsequent "4K" ping/response operation, and thus Delta equals the time to transfer four kilobytes of data after compensating for the overhead. However, as mentioned above, rather than calculate the data transfer rate from a single sample, an average is used, and thus step 1416 increments a loop counter and step 1418 evaluates whether the loop has been performed the desired number of times, (e.g., three). If not, step 1418 loops back to step 1402 where the transfer rate is again obtained. Note that while looping, if at any time a response can come back in less than ten milliseconds, the connection is considered to be fast and the process is ended.

Once the Total time for the three four-kilobyte transfers is obtained, this information may be used to determine whether the link is fast or slow. An administrator may set the slow versus fast threshold, or a default threshold may be used (e.g., 500 kilobits per second, i.e., 500 kbps). Because it is desirable to compare the actual data transfer rate with a threshold data transfer rate number that is meaningful to an administrator, steps 1430–1436 convert the Total time to a data transfer rate. To this end, step 1430 averages the time by dividing by the number of valid samples in the average, e.g., three, while step 1432 adjusts for the amount of data sent (four kilobytes) and the way in which time is measured (1000 ticks per second). Step 1434 converts bytes to bits, while step 1436 adjusts for the units of data transfer rates being in "kilobits" per second.

Once the measured data transfer rate (Z) is obtained, at step 1438 the actual rate Z is compared against a threshold value, established by default or set by an administrator. If below the rate, the link is considered slow (step 1440), while if above the rate, the link is considered fast (step 1442), whereby the link transition and link rate bits are adjusted accordingly.

Still another feature of the desktop management engine 102 enables group policy objects to be accumulated based on a machine's location in the hierarchy, instead of or in conjunction with the user's policy. By way of example, machines in a computer laboratory may need policy settings that carefully control what is allowed to be done to those machines, regardless of which user is logging on. A machine policy setting in the registry determines how policy is to be applied, in one of three modes, the normal mode, in conjunction with user policy, (merge mode), or instead of user-based policy settings (replace mode).

Figure 15:
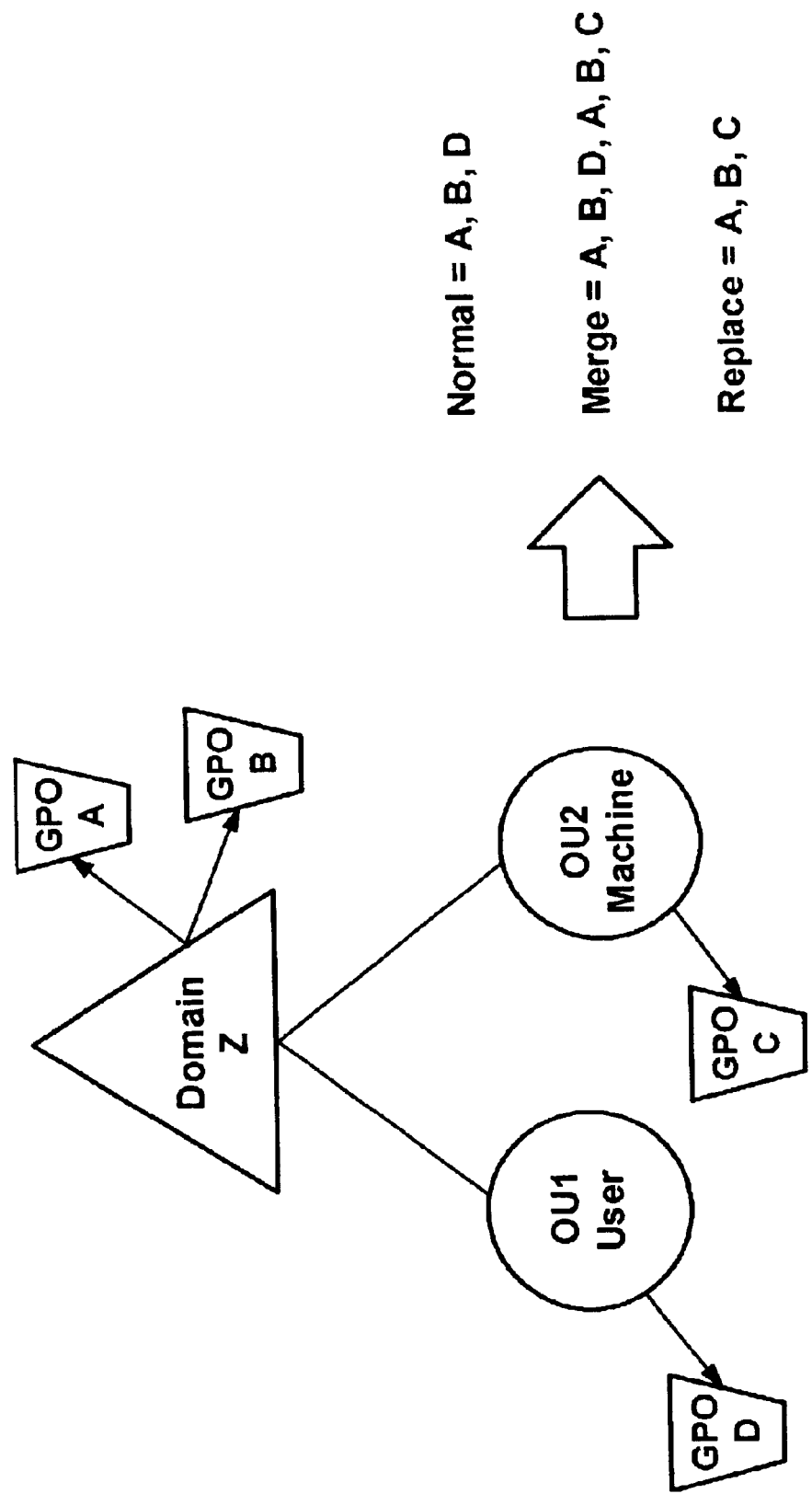
FIG. 15 is a block diagram representing how a user and a machine may fit under a number of hierarchically organized directory containers associated with group policy objects, and how those policy objects may be applied depending on a mode setting.

FIG. 15 shows an example of how policy is applied based on the mode setting, wherein users under organizational unit OU1 and machines under organizational unit OU2 are under DomainZ. As shown in FIG. 15, OU1 has a group policy object GPOD associated therewith, OU2 has a group policy object GPOC associated therewith, and DomainZ has two group policy objects associated therewith, GPOA and GPOB. As described above, in the normal node, the ordered list will be that accumulated for the user, i.e., GPOA, GPOB, and GPOD (from weakest to strongest assuming no enforcement for purposes of simplicity). If the machine indicates that merge mode should be applied, two lists of ordered group policy objects will be obtained, first one for the user and then one for the machine. The machine's policy list of ordered group policy objects is merged with the user's policy list by appending the machine policy list at the strong end of the user policy list. Thus, the ordered list of group policy objects for the hierarchy in FIG. 15 when in merge mode will be accumulated as GPOA, GPOB, GPOD GPOA, GPOB and GPOC. Lastly, when replace mode is set, the policy is simply the machine's policy list of ordered group policy objects instead of the user's policy list, GPOA, GPOB and GPOC.

As can be seen from the foregoing detailed description, there is provided a method and system for implementing policy by accumulating policies for a policy recipient, (e.g., computers or users) from policy objects associated with containers. Policy settings for the policy recipient may be accumulated by inheritance, enforced by directory objects, blocked from being inherited, and layered in a specified order. Linking group policy objects is also provided, as is exception-based management.

While the invention is susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention.

What is claimed is:

1. A computer-implemented method, comprising:
   placing policy settings into a plurality of group policy objects, each policy object associated with a directory container in a set of directory containers arranged in a hierarchy;
   accumulating the policy settings of the plurality of group policy objects into an accumulated policy, wherein conflicting settings are resolved based on the hierarchy and inheritance data, and wherein the inheritance data indicates that policy settings of a first policy object hierarchically above a second policy object are suggested and are allowed to be blocked by the second policy object; and
   associating the accumulated policy with a policy recipient associated with the set of directory containers.

2. The method of claim 1 wherein the inheritance data indicates that policy settings of a first policy object hierarchically above a second policy object are enforced and must be inherited.

3. The method of claim 1 wherein the inheritance data indicates that non-enforced policy settings of a first policy object hierarchically above a second policy object are to be blocked.

4. The method of claim 1 wherein accumulating the policy comprises arranging the policy objects into a master list for applying to the policy recipient.

5. The method of claim 1 further comprising, applying policy settings to the policy recipient, including inheriting at least one policy settings from a policy object that is hierarchically above the policy recipient.

6. The method of claim 1 further comprising, applying policy settings to the policy recipient, including blocking at least one policy settings from a policy object that is hierarchically above the policy recipient.

7. A computer-readable medium having computer-executable instructions for performing a method, comprising:
   placing policy settings into a plurality of group policy objects, wherein each of the policy objects is associated with a directory container organized in a hierarchy of directory containers;
   inheriting at least some of the settings from at least one policy object associated with a directory container hierarchically above a policy recipient;
   blocking the inheritance of settings from at least one other policy object associated with a directory container hierarchically above the policy recipient;
   ordering the group policy objects based on the hierarchy of directory containers; and
   associating the ordering of the group policy objects with the policy recipient, wherein at least one policy object includes an exclusion list of at least one user to which the policy will not apply.

8. The computer-readable medium of claim 7 further comprising, applying policy settings to the policy recipient based on the ordering of the group policy objects.

9. The computer-readable medium of claim 7 wherein at least one policy object includes an inclusion list of at least one user to which the policy will apply.

10. A computer-readable medium having computer-executable instructions for performing a method, comprising:
    placing policy settings into a plurality of group policy objects, wherein each of the policy objects is associated with a directory container organized in a hierarchy of directory containers;
    inheriting at least some of the settings from at least one policy object associated with a directory container hierarchically above a policy recipient;
    blocking the inheritance of settings from at least one other policy object associated with a directory container hierarchically above the policy recipient;
    ordering the group policy objects based on the hierarchy of directory containers; and associating the ordering of the group policy objects with the policy recipient, wherein at least one policy object includes an inclusion list of at least one user to which the policy will apply.

11. The computer-readable medium of claim 10 further comprising, applying policy settings to the policy recipient based on the ordering of the group policy objects.

12. The computer-readable medium of claim 10 wherein at least one policy object includes an exclusion list of at least one user to which the policy will not apply.

13. A computer-readable medium having computer-executable instructions for performing a method, comprising:
    placing policy settings into a plurality of group policy objects, wherein each of the policy objects is associated with a directory container organized in a hierarchy of directory containers;
    inheriting at least some of the settings from at least one policy object associated with a directory container hierarchically above a policy recipient;
    blocking the inheritance of settings from at least one other policy object associated with a directory container hierarchically above the policy recipient;
    ordering the group policy objects based on the hierarchy of directory containers; and
    associating the ordering of the group policy objects with the policy recipient, including developing an ordered master list of group policy objects; and
    applying policy settings to the policy recipient, including writing settings from the group policy objects into a database from weakest to strongest based on the ordered master list.

14. The computer-readable medium of claim 13 further comprising, seeking a defined policy setting to apply to the policy recipient by evaluating policy settings from the group policy objects from strongest to weakest based on the ordered master list.

15. The computer-readable medium of claim 13 wherein at least one policy object includes an exclusion list of at least one user to which the policy will not apply.

16. The computer-readable medium of claim 13 wherein at least one policy abject includes an inclusion list of at least one user to which the policy will apply.

17. A computer-readable medium having computer-executable instructions for performing a method, comprising:
    placing policy settings into a plurality of group policy objects, wherein each of the policy objects is associated with a directory container organized in a hierarchy of directory containers;
    inheriting at least some of the settings from at least one policy object associated with a directory container hierarchically above a policy recipient;
    blocking the inheritance of settings from at least one other policy object associated with a directory container hierarchically above the policy recipient;
    ordering the group policy objects based on the hierarchy of directory containers;
    associating the ordering of the group policy objects with the policy recipient, including developing an ordered master list of group policy objects; and
    seeking a defined policy setting to apply to the policy recipient by evaluating policy settings from the group policy objects from strongest to weakest based on the ordered master list.

18. The computer-readable medium of claim 17 further comprising, applying policy settings to the policy recipient based on the ordering of the group policy objects.

19. The computer-readable medium of claim 17 further comprising, applying policy settings to the policy recipient, including writing settings from the group policy objects into a database from weakest to strongest based on the ordered master list.

20. The computer-readable medium of claim 17 wherein at least one policy object includes an exclusion list of at least one user to which the policy will not apply.

21. The computer-readable medium of claim 17 wherein at least one policy object includes an inclusion list of at least one user to which the policy will apply.

22. A computer-readable medium having computer-executable instructions for performing a method, comprising:
    placing policy settings into a plurality of group policy objects, wherein each of the policy objects is associated with a directory container organized in a hierarchy of directory containers;
    inheriting at least some of the settings from at least one policy object associated with a directory container hierarchically above a policy recipient;
    blocking the inheritance of settings from at least one other policy object associated with a directory container hierarchically above the policy recipient;
    ordering the group policy objects based on the hierarchy of directory containers; and
    associating the ordering of the group policy objects with the policy recipient;
    disabling at least part of the association between a directory container and a group policy object.

23. The computer-readable medium of claim 22 further comprising, applying policy settings to the policy recipient based on the ordering of the group policy objects.

24. The computer-readable medium of claim 22 wherein associating the ordering of the group policy objects with the policy recipient comprises, developing an ordered master list of group policy objects.

25. The computer-readable medium of claim 24 further comprising, applying policy settings to the policy recipient, including writing settings from the group policy objects into a database from weakest to strongest based on the ordered master list.

26. The computer-readable medium of claim 24 further comprising, applying policy settings to the policy recipient, including seeking a defined policy setting to apply to the policy recipient by evaluating policy settings from the group policy objects from strongest to weakest based on the ordered master list.

27. The computer-readable medium of claim 22 wherein disabling at least part of the association comprises disabling the computer settings but not the user settings.

28. The computer-readable medium of claim 22 wherein disabling at least part of the association comprises disabling the user settings but not the computer settings.

29. The computer-readable medium of claim 22 wherein at least one policy object includes an exclusion list of at least one user to which the policy will not apply.

30. The computer-readable medium of claim 22 wherein at least one policy object includes an inclusion list of at least one user to which the policy will apply.

* * * * *